(12) United States Patent
Cheng et al.

(10) Patent No.: US 11,081,140 B1
(45) Date of Patent: Aug. 3, 2021

(54) SYSTEMS AND METHODS FOR GENERATING TEMPLATES FOR SHORT-FORM MEDIA CONTENT

(71) Applicant: Facebook, Inc., Menlo Park, CA (US)

(72) Inventors: Zhibin Cheng, Mountain View, CA (US); Seth Lee Weisfeld, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/911,224

(22) Filed: Jun. 24, 2020

(51) Int. Cl.
*G11B 27/036* (2006.01)
*H04N 5/93* (2006.01)

(52) U.S. Cl.
CPC ......... *G11B 27/036* (2013.01); *H04N 5/9305* (2013.01)

(58) Field of Classification Search
None
See application file for complete search history.

(56) References Cited

U.S. PATENT DOCUMENTS

| 2010/0031149 A1* | 2/2010 | Gentile | H04N 5/91 715/723 |
| 2016/0007093 A1* | 1/2016 | Liu | H04N 21/812 725/32 |

* cited by examiner

*Primary Examiner* — Eileen M Adams
(74) *Attorney, Agent, or Firm* — FisherBroyles, LLP

(57) ABSTRACT

The disclosed computer-implemented method may include extracting, from a baseline video file, metadata that identifies at least one characteristic of the baseline video file, creating, using the extracted metadata as a framework, a template for remixing the baseline video file with new content, obtaining at least one new item of content, and creating, using the template, a remixed version of the baseline video file by replacing at least one original item of content in the baseline video file with the new item of content. Various other methods, systems, and computer-readable media are also disclosed.

20 Claims, 17 Drawing Sheets

SYSTEMS AND METHODS FOR GENERATING TEMPLATES FOR SHORT-FORM MEDIA CONTENT

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
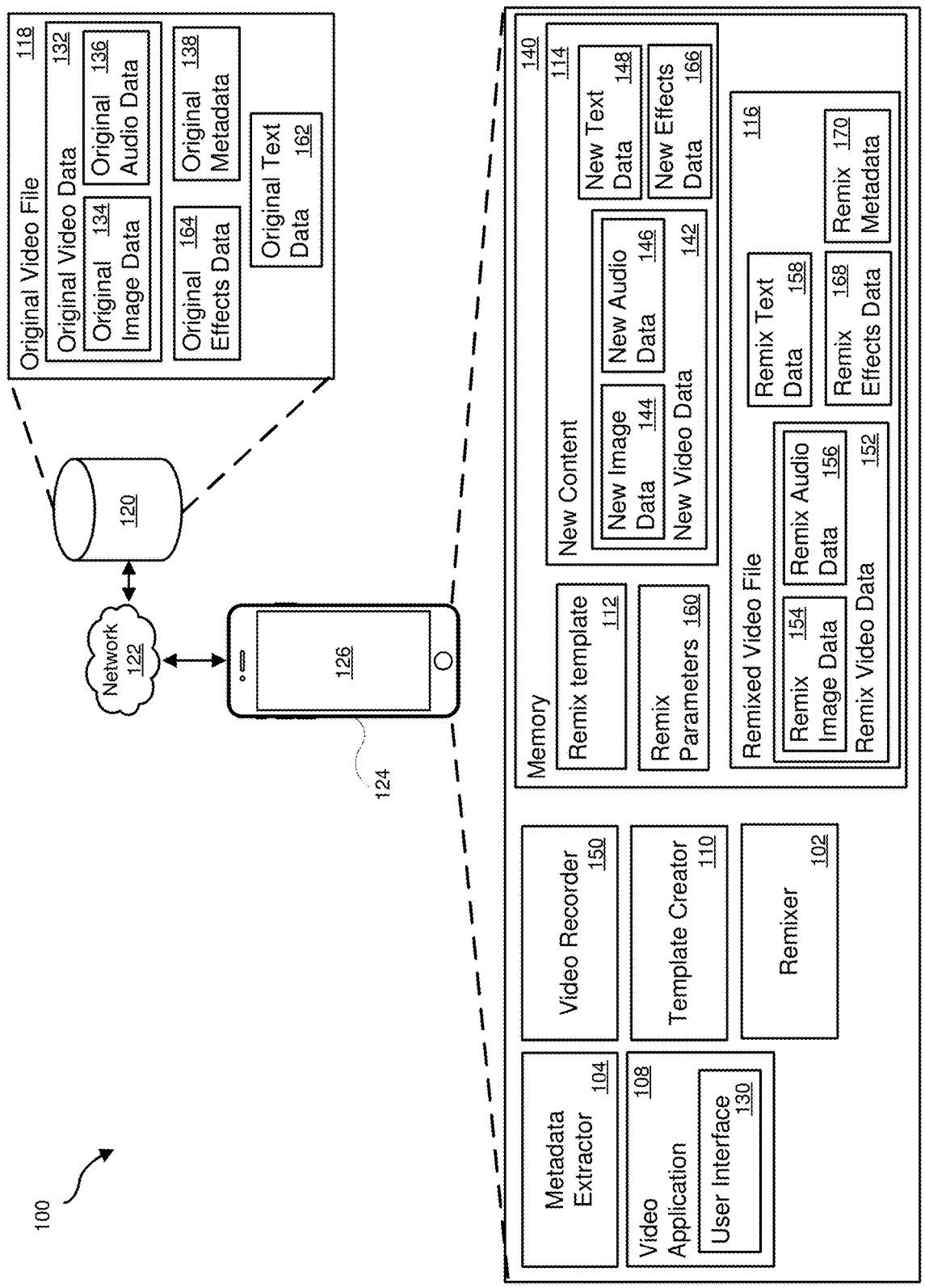
FIG. 1 is a block diagram of an example system for creating a remixed video file based on an original video file using a remix template and new content provided by a user.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The creation and proliferation of "meme" videos and other short-form video content has exploded in recent years. Once a particular meme video becomes popular, it is common for other users to generate new meme videos that mimic or follow the format of the original. Unfortunately, the meme creation process can be tedious for end users since it often requires creating a new video or clip from scratch.

The present disclosure is generally directed to automatically generating templates for composing and posting short-form videos, greatly simplifying the process for end users. As will be explained in greater detail below, a video application may generate a template based on an existing short-form video, allowing a user to "remix" an existing video with their own content. In this example, the disclosed system may identify (using, e.g., metadata associated with the original video) various characteristics of the original video that is to be remixed, such as the number of clips included in the video, the length of each clip included in the video, music included in the video (including, e.g., the exact start and end point of a music clip), effects included in the video, transitions used in the video (and their associated timestamps), text overlays added to the video (and their associated timestamps), etc. The system may then use these characteristics to build a template that allows the user to quickly and easily "remix" or mimic the format of the original video by substituting their own content (e.g., new video clips, text overlays, etc.) in place of the original content. By doing so, the disclosed system may greatly simplify and speed up the video composing and creating process for end users.

Figure 2:
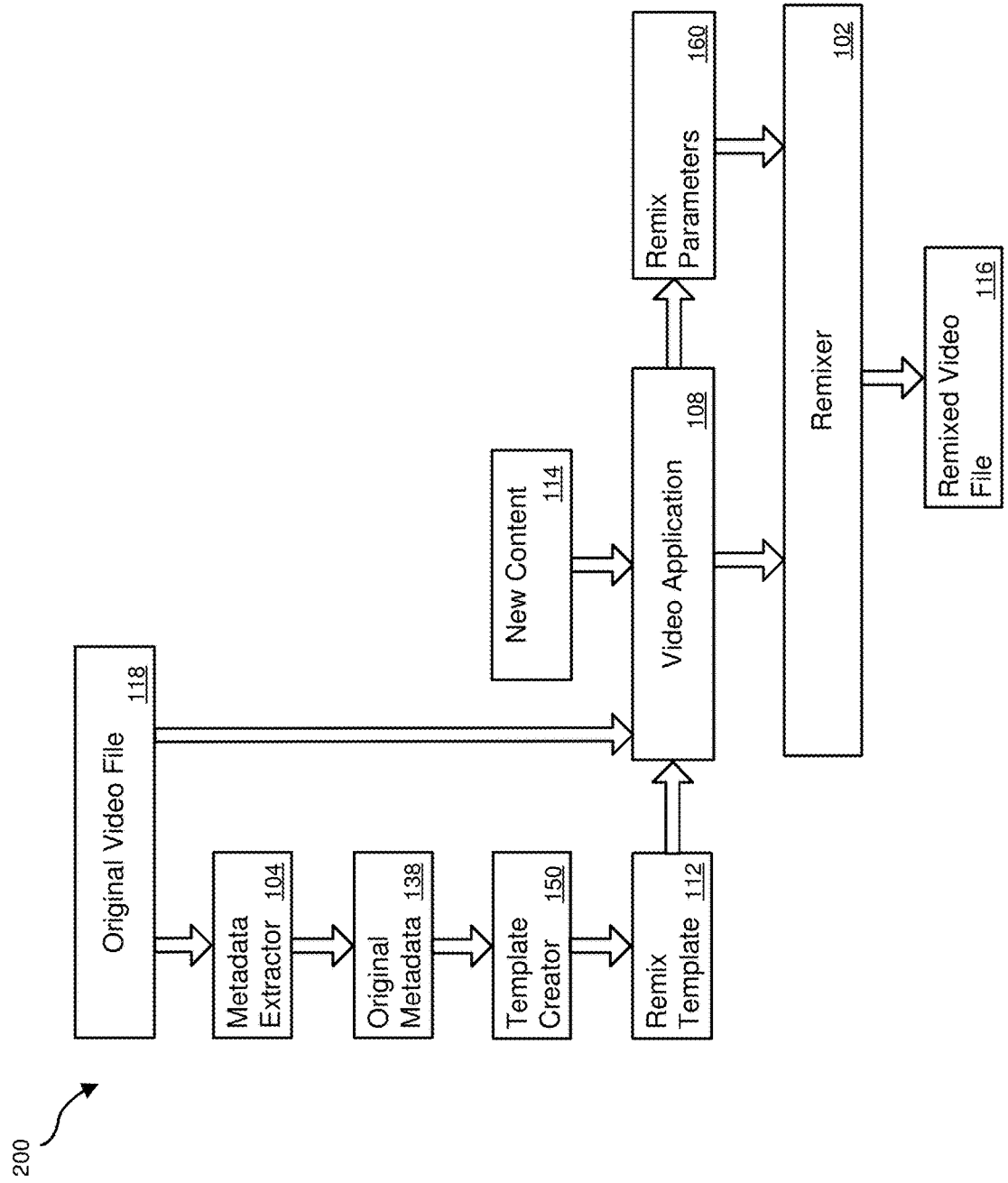
FIG. 2 is a block diagram of an example flow of a process for remixing a baseline video file with new content.
Figure 3:
FIG. 3 is an illustration representative of a first clip of an example baseline video file that includes a first text overlay.
Figure 4:
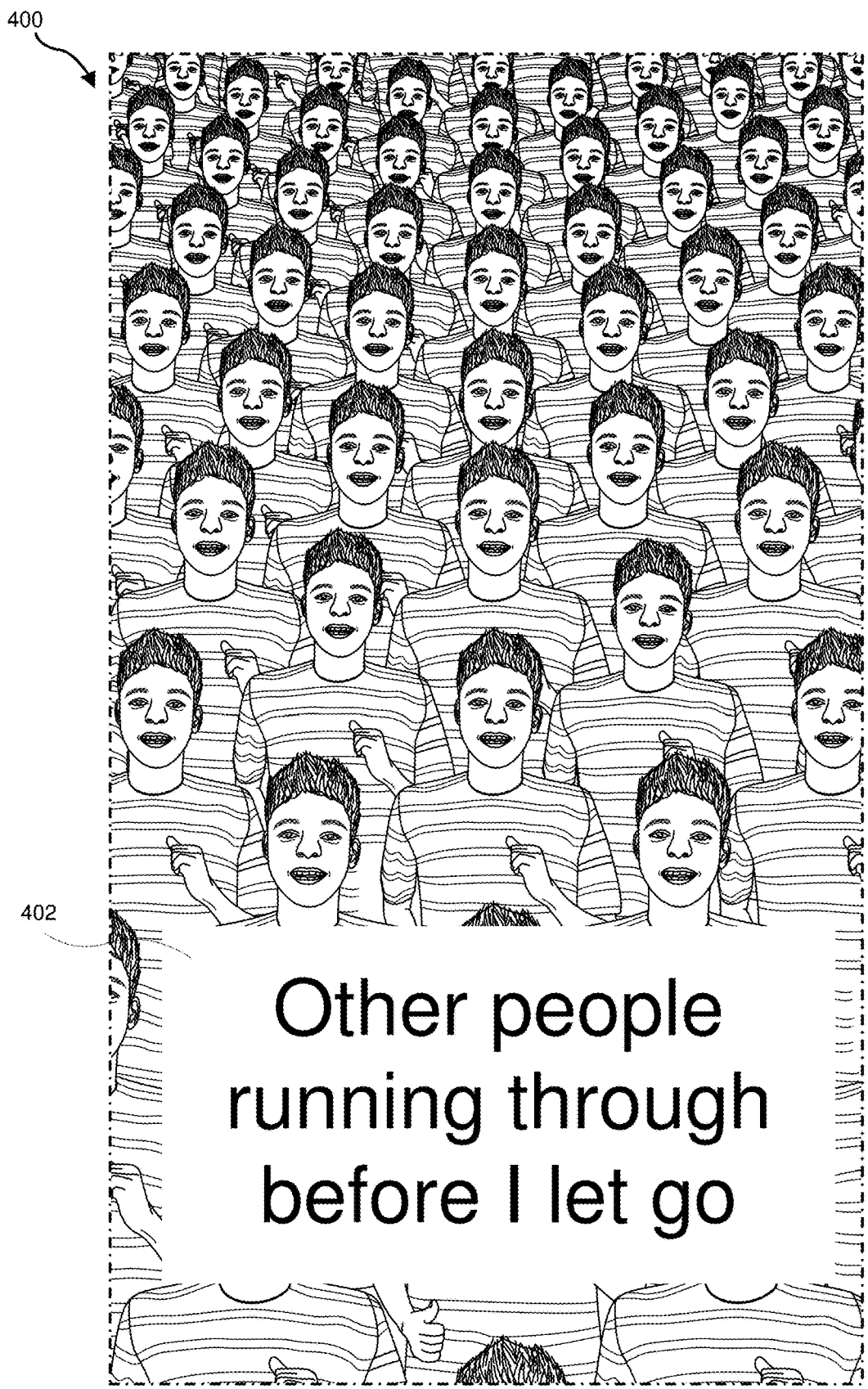
FIG. 4 is an illustration representative of a second clip of an example baseline video file that includes a second text overlay.

The following will provide, with reference to FIGS. 1 and 2, detailed descriptions of a system and process for creating a remixed version of a baseline video file. The descriptions corresponding to FIGS. 3 and 4 provide an overview of a baseline video file, while the descriptions corresponding to FIGS. 5-14 detail the creation of a remixed version of a baseline video file. Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 is a block diagram of an example system 100 for creating a remixed video file 116 based on an original video file 118 using a remix template 112 and new content 114 provided by a user. In some implementations, the remix template 112 may be generated based on metadata for the original video file 118 (e.g., original metadata 138). A system (e.g., the system 100) may use a baseline video file (e.g., the original video file 118) when creating a remixed version of the baseline video file (e.g., the remixed video file 116).

A repository may include or store an original video file. For example, a repository 120 may store the original video file 118. In some implementations, a repository may be a memory device. In some implementations, a repository may be a database. The memory or repository may include one or more volatile or non-volatile storage devices or mediums capable of storing data. Examples of memory devices for storing data may include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

A computing device may access a repository by way of a network to obtain a baseline video file. For example, a computing device 124 may access the repository 120 by way of a network 122 to obtain the original video file 118. The network 122 may be any communication network, such as the Internet, a Wide Area Network (WAN), or a Local Area Network (LAN), and may include various types of communication protocols and physical connections. The computing device 124 may represent a client device or a user device, such as a desktop computer, a laptop computer, a tablet device, a smartphone, a personal digital assistant (PDA), or other computing device.

A computing device may include memory for storing content, data, and/or software applications. The memory may include one or more memory devices. For example, the computing device 124 may include memory 140. The memory 140 may include or store a remix template 112, remix parameter(s) 160, new content 114, and a remixed video file 116. In addition, or in the alternative, software application(s) and/or data included in one or more modules may also be stored in memory. For example, the video application 108, a metadata extractor 104, a video recorder 110, a remixer 102, and a template creator 150 may be modules that may be stored in a memory device. The modules may store software instructions, along with data (e.g., input and/or output data) processed by execution of the software instructions. The computing device 124 may include one or more processors for executing the software application(s).

An original video file may include content for use in generating a video for viewing on a display device of a computing device. For example, the original video file 118 may include content that includes, but is not limited to, original video data 132, original text data 162, original metadata 138, and original effects data 164. The original video data 132 may include original image data 134 and original audio data 136. In some implementations, the original image data 134 may be video clip data for one or more video clips included in the original image data 134. In some implementations, the original audio data 136 may be music (e.g., a music file). Once the computing device 124 obtains the original video file 118 from the repository 120 by way of the network 122, the computing device 124 may generate a video for viewing on a display device 126 of the computing device 124 based on the content included in the original video file 118. In some implementations, a video application 108 may generate the video based on the content included in the original video file 118.

A user may interact or interface with a user interface of a video application when remixing a video. For example, a user may interface with a user interface 130 included in the video application 108. The video application 108 may display the user interface 130 on the display device 126 of the computing device 124. The user, by way of a user interface (e.g., the user interface 130), may select a baseline video file (e.g., the original video file 118), view a video of the baseline video file, provide, select and/or enter data (e.g., the new content 114) for remixing with the baseline video file, and control the remixing of the baseline video file when creating a remixed video file (e.g., the remixed video file 116).

A computing device may obtain new content for remixing with a baseline video file. The new content that may be used for remixing with the baseline video file may be determined based on metadata for the baseline video file. The metadata may include, but is not limited to, metadata for one or more clips included in the baseline video file, metadata for audio data included in the baseline video file, metadata for the effects data for the baseline video file, and metadata for a text overlay for the text data included in the baseline video file. A user interacting with a user interface may provide, select, and/or enter data for remixing with a baseline video file based on the metadata. For example, a user interacting with the user interface 130 may capture, enter, and/or select new image data 144, new audio data 146, new effects data 166, and/or new text data 148 that the system 100 may use when remixing the original video file 118.

In some implementations, a video recorder included on a computing device may capture image and/or audio data as video data. For example, the user may capture the new image data 144 using a video recorder 110 included on the computing device 124. In some implementations, the new image data 144 may be video clip data for remixing with the original video file 118 to generate the remixed video file 116. The capturing of the new image data 144 is described herein with reference to FIG. 7. In addition, or in the alternative, the user may capture new audio data 146 using the video recorder 110. The video recorder 110 may interface with a camera and a microphone included on the computing device 124 to capture the new image data 144 and the new audio data 146, respectively. The captured new image data 144 may be stored as new video data 142 for new content 114. The captured new audio data 146 may be stored as the new audio data 146 for the new content 114. The new content 114 may be stored in the memory 140.

In some implementations, a user may select new video data for remixing with a baseline video file from a library or collection of video data of the user. For example, a user may access a library or collection of video files of the user that is stored in a memory device, repository, or database associated with the user. In some implementations, the video file(s) may be stored in the memory 140 of the computing device 124. In some implementations, the video file(s) of the user may be stored in the cloud, in the repository 120, or in another system remote from the computing device 124 and accessible by the computing device 124 by way of the network 122.

In some implementations, the audio data for a video file may be music (e.g., a music file, a song, etc.). For example, in cases where the audio data is music, a user may select new music from a library of music. In some implementations, the music library may be stored on the computing device 124. In some implementations, the music library may be stored in the cloud, in the repository 120, or in another system remote from the computing device 124 and accessible by the computing device 124 by way of the network 122.

A user may select new effects data for remixing with a baseline video file. For example, a user may select a new effect from a library or collections of effects that may be applied to a video file when remixing the video file. In some implementations, the video application 108 may provide effect(s) for selection by a user by way of the user interface 130.

A user may also provide, select, or enter text data for remixing with a baseline video file. For example, a user may enter the text data by way of the user interface 130. In some implementations, a user may select text data from an available library or collection of text data by way of the user interface 130.

A computing device may determine metadata associated with a baseline video file. The metadata may include information and/or data related to one or more characteristics of the baseline video file. The one or more characteristics of the baseline video file may include, but are not limited to, a number of clips included in the baseline video file, a length or duration of each clip included in the baseline video file, audio content included in the baseline video file, music content included in the baseline video file, a name of a song that comprises the music content, a start time of the audio content, one or more effects included in the video, a type for each identified effect, a clip to apply the effect to, one or more audio effects included in the video, one or more transitions used in the video, and one or more text overlays included in the video.

The metadata may include, but is not limited to, metadata for clips included in the baseline video file, metadata for audio data for the baseline video file, metadata for one or more effects for the baseline video file, and metadata for text overlay(s) for the baseline video file. Metadata for clips included in the baseline video file may include, but is not limited to, a number of clips included in the baseline video file and a duration of each clip. Metadata for audio data for the baseline video file may include, but is not limited to, a name of the music for the audio data and a start time of the music. Metadata for one or more effects for the baseline video file may include, but is not limited to, a type of effect, and which clip to apply the effect to. Metadata for text overlay(s) for the baseline video file may include, but is not limited to, a number of text overlays, a duration of each text overlay, a start time in the baseline video file for each text overlay, a position of each text overlay on the video, and a style of each text overlay. The style of each text overlay may include, but is not limited to, a font type for the text, a color of the text, an alignment of the text within the clip of the video, whether to provide the text overlay with or without a background color, and, if a selection for the use of a back ground color for the text overlay is selected, a color for the background color.

A system may use the metadata when creating a remixed version of the baseline video file. For example, the computing device 124 may include a metadata extractor 104. The metadata extractor 104 may extract original metadata 138 from the original video file 118. The original metadata 138 may include metadata (e.g., information and/or data) related to one or more characteristics of the original video file 118. The metadata may include, but is not limited to, metadata for one or more clips included in the original video file 118, metadata for the original audio data 136 included in the original video file 118, metadata for the original effects data 164 included in the original video file 118, and metadata for a text overlay for the original text data 162 included in the original video file 118.

A template creator may create a template for use in remixing a baseline video file. The template creator may create the template using metadata extracted from the baseline video file as a framework. The remixing may use one or more remix parameters for associated characteristics of the baseline video file identified in metadata for the baseline video file. For example, the template creator 150 may create a remix template 112 for use by the remixer 102 to create or generate a remixed version of the original video file (e.g., the remixed video file 116). The template creator 150 may use the original metadata 138 for the original video file 118 as a framework for the creation of the remix template 112. A user interacting with the user interface 130 may enter one or more remix parameters 160. The remixer 102 may access the remix template 112, the remix parameters 160, and the new content 114 when creating the remixed video file 116.

Remix parameters may specify alternatives or substitutions for one or more characteristics identified in metadata for a baseline video file. For example, the remix parameters 160 may specify alternatives or substitutions for one or more characteristics of the original metadata 138 for the original video file 118 for use by the remixer 102 when remixing the original video file 118 with the new content 114 to create the remixed video file 116. The memory 140 may store the remix template 112 and/or the remix parameters 160. The memory 140 may store the remix template 112 in association with the original video file 118. For example, the association may be based on a Uniform Resource Locator (URL) of original video file 118.

A remixer may use new content to create a remix of a baseline video file (e.g., a remixed video file) based on one or more parameters and a template. In some implementations, the remix parameters 160 may specify a substitute or replacement for the original image data 134 as new image data 144. The remixer 102 may substitute, swap, or replace the original image data 134 with the new image data 144 when generating remix image data 154 for the remixed video file 116. In some implementations, the remix parameters 160 may specify a substitute or replacement for the original audio data 136 as new audio data 146. The remixer 102 may substitute, swap, or replace the original audio data 136 with the new audio data 146 when generating remix audio data 156 for the remixed video file 116. Remix video data 152 for the remixed video file 116 may include the remix image data 154 and the remix audio data 156.

In some implementations, the remix parameters 160 may specify a substitute or replacement for the original effects data 164 as new effects data 166. The remixer 102 may substitute, swap, or replace the original effects data 164 with the new effects data 166 when generating remix effects data 168 for the remixed video file 116. In some implementations, the remix parameters 160 may specify a substitute or replacement for the original text data 162 as new text data 148. The remixer 102 may substitute, swap, or replace the original text data 162 with the new text data 148 when generating remix text data 158 for the remixed video file 116.

A remixer may store metadata for a remixed version of a baseline video file. For example, the remixer 102 may store metadata for the remixed video file 116 as remix metadata 170. The remix metadata 170 may include data for the metadata used in the creation of the remixed video file 116. The remix metadata 170 may include metadata for one or more clips included in the remixed video file 116, metadata for the remix audio data 156 included in the remixed video file 116, metadata for the original effects data 164 included in the original video file 116, and metadata for one or more text overlays for the remix text data 158 included in the remixed video file 116.

A remixed video file may mimic a baseline video file. In some implementations, the remixed video file 116 may mimic the original video file 118 by substituting, swapping, or replacing less than all or a subset of all the characteristics of the original metadata 138 for the original video file 118. For example, the remixed video file 116 may mimic the original video file 118 by including new image data 144 for the remix image data 154 and new text data 148 for the remix text data 158 while including the original audio data 136 for the remix audio data 156 and the original effects data 164 for the remix effects data 168. An example of creating such a remixed video file is shown with reference to FIGS. 5-12.

FIG. 2 is a block diagram of an example flow of a process 200 for remixing a baseline video file with new content. For example, referring to FIG. 1, the remixer 102 may remix the original video file 118 with the new content 114 based on the remix template 112 and the remix parameters 160. The remixer 102 may create or generate the remixed video file 116.

The video application 108 may access the original video file 118 and the new content 114. The metadata extractor 104 may receive the original video file 118 as input. The metadata extractor 104 may extract the original metadata 138 from the original video file 118. The template creator 150 may receive the original metadata 138 as input. The template creator 150 may create or generate the remix template 112 for use in creating and generating a remixed video file 116. As described herein, the remix template 112 may identify characteristics of the original video file 118 that may be substituted, swapped, or otherwise altered when creating the remixed video file 116 based on the original video file 118 that mimics the original video file 118.

The video application 108 may receive the remix template 112 as input. The remix template 112 may provide the video application 108 with information and data for the identified characteristics of the original video file 118 that may be substituted, swapped, or otherwise altered to create a remixed version of the original video file 118. The video application 108 may use the information and data for the identified characteristics to generate a user interface (e.g., the user interface 130) that enables a user to provide, select and/or enter information and data for substituting, altering, and/or swapping with identified characteristics of the original video file 118 when creating a remixed version of the original video file 118 (e.g., the remixed video file 116).

The video application 108 may provide the information and data for substituting, altering, and/or swapping with identified characteristics of the original video file 118 provided by a user by way of the user interface 130 as remix parameters 160 to the remixer 102. The remixer 102 may identify data included in the new content 114 for swapping with data included in the original video file 118. The remixer 102 may create the remixed video file 116 by substituting, altering, and/or swapping the identified data based on the remix template 112.

The video application 108 may provide the original video file 118 and the new content 114 to the remixer 102 for use in remixing the original video file 118 to create or generate the remixed video file 116. In some implementations, the video application 108 may provide particular content of the original video file 118 and particular content of the new content 114 for creating the remixed video file 116 based on the remix parameters 160. In some implementations, the video application may provide the original video file 118 and the new content 114 along with the remix parameters 160 to the remixer 102. The remixer 102, based on the remix parameters 160, may determine the particular content of the original video file 118 and the particular content of the new content 114 to use when creating or generating the remixed video file 116.

In a non-limiting example, a user may select the original video file 118. The user may want to mimic the original video file 118 by substituting the new image data 144 provided by the user (e.g., the user recorded one or more video clips) with the original image data 134 (e.g., respective one or more video clips included in the original video file 118). The user may enter new text data 148 (e.g., by way of the user interface 130) for substituting with the original text data 162. The user may want to mimic the original video file 118 by maintaining the original audio data 136 (e.g., music) and by maintaining the original effects data 164. The remix parameters 160 may reflect the selections of the user. The remixer 102 may receive the remix parameters 160 for use in creating the remixed video file 116. The remixer 102 may create or generate the remixed video file 116 that may include the original audio data 136 as the remix audio data 156, the new image data 144 as the remix image data 154, the new text data 148 as the remix text data 158, and the original effects data 164 as the remix effects data 168.

In another non-limiting example, a user may select the original video file 118. The user may want to mimic the original video file 118 by substituting the new audio data 146 provided by the user (e.g., user selected music) with the original audio data 136. The user may enter new text data 148 (e.g., by way of the user interface 130) for substituting with the original text data 162. The user may want to mimic the original video file 118 by maintaining the original image data 134 and by maintaining the original effects data 164. The remix parameters 160 may reflect the selections of the user. The remixer 102 may receive the remix parameters 160 for use in creating the remixed video file 116. The remixer 102 may create or generate the remixed video file 116 that may include the original image data 134 as the remix image data 154, the new audio data 146 as the remix audio data 156, the new text data 148 as the remix text data 158, and the original effects data 164 as the remix effects data 168.

In another non-limiting example, a user may select the original video file 118. The user may want to mimic the original video file 118 by substituting the new image data 144 provided by the user (e.g., the user recorded one or more video clips) with the original image data 134 (e.g., respective one or more video clips included in the original video file 118) and by substituting the new effects data 166 with the original effects data 164. The user may want to mimic the original video file 118 by maintaining the original audio data 136 (e.g., music) and by maintaining the original text data 162. The remix parameters 160 may reflect the selections of the user. The remixer 102 may receive the remix parameters 160 for use in creating the remixed video file 116. The remixer 102 may create or generate the remixed video file 116 that may include the original audio data 136 as the remix audio data 156, the new image data 144 as the remix image data 154, the original text data 162 as the remix text data 158, and the new effects data 166 as the remix effects data 168.

Metadata for a baseline video file may include information and data for use in generating a video based on the content of the baseline video file. The metadata may include information and data for video clips included in the baseline video file. For example, a baseline video file may include one or more identified clips or segments. Each clip may include an identified part or aspect of the baseline video file. A video clip (or clip) may be a short video that includes visual and audio data excerpted from the baseline video file. A baseline video file may include one or more clips. Examples described herein with reference to FIGS. 3-14 describe a baseline video file that includes two clips. In some implementations, a baseline video file may include less than two clips (e.g., one clip). In some implementations a baseline video file may include more than two clips (e.g., three or more clips).

FIG. 3 is an illustration representative of a first clip 300 of an example baseline video file that includes a first text overlay 302. For example, referring to FIGS. 1 and 2, the baseline video file may be the original video file 118. The first clip 300 may be a video recording of a person opening and holding open a door. The person may be opening to door to allow another random person to enter a room.

FIG. 4 is an illustration representative of a second clip 400 of an example baseline video file that includes a second text overlay 402. The second clip 400 may be a video recording of an effect as applied to the image data for the baseline video file. For example, referring to FIGS. 1 and 2, the baseline video file may be the original video file 118. The second clip 400 may be a visual effect applied to the original image data 134 for the original video file 118.

Metadata for a baseline video file may include information and data for video clips included in the baseline video file. For example, referring to FIGS. 1-4, the original metadata 138 may include metadata indicating the number of clips included in the original video file 118 (e.g., two clips, the first clip 300 and the second clip 400). In addition, the original metadata 138 may include metadata for each clip (e.g., metadata for the first clip 300 and metadata for the second clip 400) of the original video file 118. The metadata for each clip be a duration of each clip. For example, a duration for the video recording of the original video file 118 may be eleven seconds. A duration for the first clip 300 may be 6.4 seconds and a duration of the second clip 400 may be 4.6 seconds.

A baseline video file may also include audio content that is played during all or part of the duration of the video. Metadata for the baseline video file may include information and data for the audio data for the baseline video file. In some implementations, the audio content may be music. For example, referring to FIGS. 1-4, the original metadata 138 may include metadata indicating the name of the music (e.g., the name of a song) for the original audio data 136 and a start time of the music during the video recording of the original video file 118. For example, the name of the music may be "Song 1" and may start at zero seconds (i.e., the start of the video recording). "Song 2," in contrast, may start at 6.4 seconds after the start of the video recording. In this example, "Song 1" plays for the duration of the first clip 300 and "Song 2" plays for the duration of the second clip 400.

A baseline video file may also include an effect for applying to a clip of the baseline video file. Metadata for the baseline video file may include information and data for one or more effects that may be applied to the data for the baseline video file. For example, referring to FIGS. 1-4, the original metadata 138 may include metadata indicating a type of effect and which clip to apply the effect to. The type of effect may be a type of visual and/or audio effect. For example, referring to FIGS. 1-4, the original metadata 138 may include metadata indicating a type of visual effect to apply to the image data to generate the second clip 400.

A baseline video file may also include one or more text overlays applied to the image data of the baseline video file. Metadata for the baseline video file may include information and data for each of the one or more text overlays for the baseline video file. For example, the original metadata 138 may include metadata indicating a number of text overlays. For each text overlay, the original metadata 138 may include a duration of the text overlay during the video recording of the original video file 118, a start time for inclusion of the text overlay in the video recording of the original video file 118, a position of the text overlay on the original image data 134 of the original video file 118, and a style of the text overlay. The style of the text overlay may include a font type for the text in the text overlay, a color of the text in the text overlay, an alignment of the text within the image data, whether to provide the text overlay on the image data with or without a background color, and, if a selection for the use of a back ground color for the text overlay is selected, a color for the background color.

For example, referring to FIGS. 1-4, the original metadata 138 may include metadata indicating a number of text overlays included in the original video file 118 (e.g., two text overlays, the first text overlay 302 and the second text overlay 402). In addition, the original metadata 138 may include metadata for each text overlay (e.g., metadata for the first text overlay 302 and metadata for the second text overlay 402) of the original video file 118. The original text data 162 may include the text for the first text overlay 302 and the second text overlay 402. The metadata for the first text overlay 302 may include a duration of the text overlay during the video recording of the original video file 118 (e.g., 6.4 seconds, the duration of the first clip 300), a start time for inclusion of the text overlay in the video recording of the original video file 118 (e.g., 0 seconds, the start of the video recording), a position of the text overlay on the original image data 134 of the original video file 118 (e.g., x,y coordinates for the start of the first text overlay 302 within the original image data 134), and a style of the text overlay. The style of the text overlay may include a font type for the text in the text overlay (e.g., Ariel font), a color of the text in the text overlay (e.g., black), an alignment of the text within the image data (e.g., center the text in the text overlay), whether to provide the text overlay on the image data with or without a background color, and, if a selection for the use of a background color for the text overlay is selected, a color for the background color (e.g., use of a white background).

For example, referring to FIGS. 1-4, the metadata for the second text overlay 402 may include a duration of the text overlay during the video recording of the original video file 118 (e.g., 4.6 seconds, the duration of the second clip 400), a start time for inclusion of the text overlay in the video recording of the original video file 118 (e.g., 6.4 seconds), a position of the text overlay on the original image data 134 of the original video file 118 (e.g., x,y coordinates for the start of the second text overlay 402 within the original image data 134), and a style of the text overlay. The style of the text overlay may include a font type for the text in the text overlay (e.g., Ariel font), a color of the text in the text overlay (e.g., black), an alignment of the text within the image data (e.g., center the text in the text overlay), whether to provide the text overlay on the image data with or without a background color, and, if a selection for the use of a background color for the text overlay is selected, a color for the background color (e.g., use of a white background).

Figure 11:
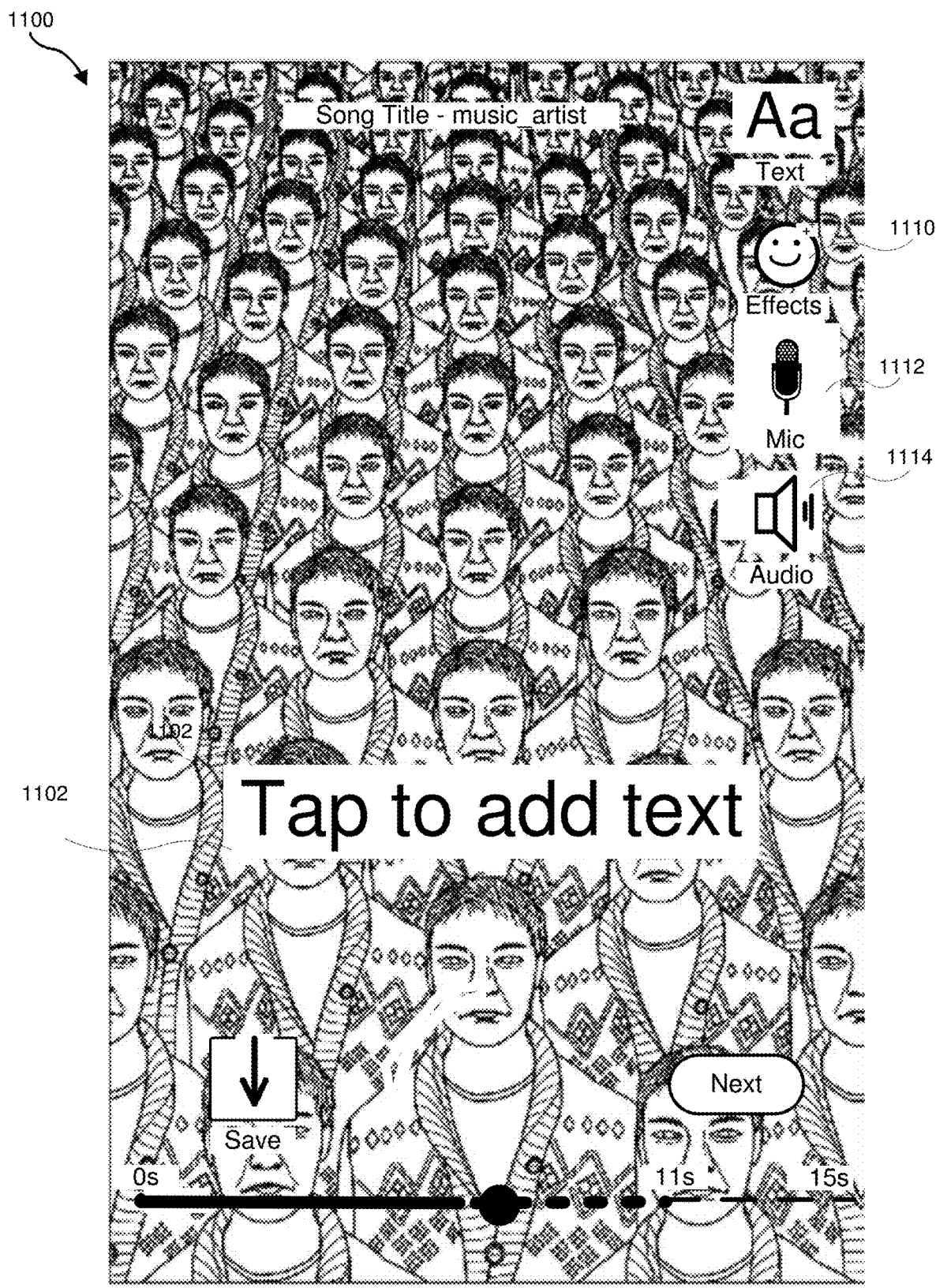
FIG. 11 is an illustration of an example user interface for adding text to a second clip of a remixed video file.
Figure 12:
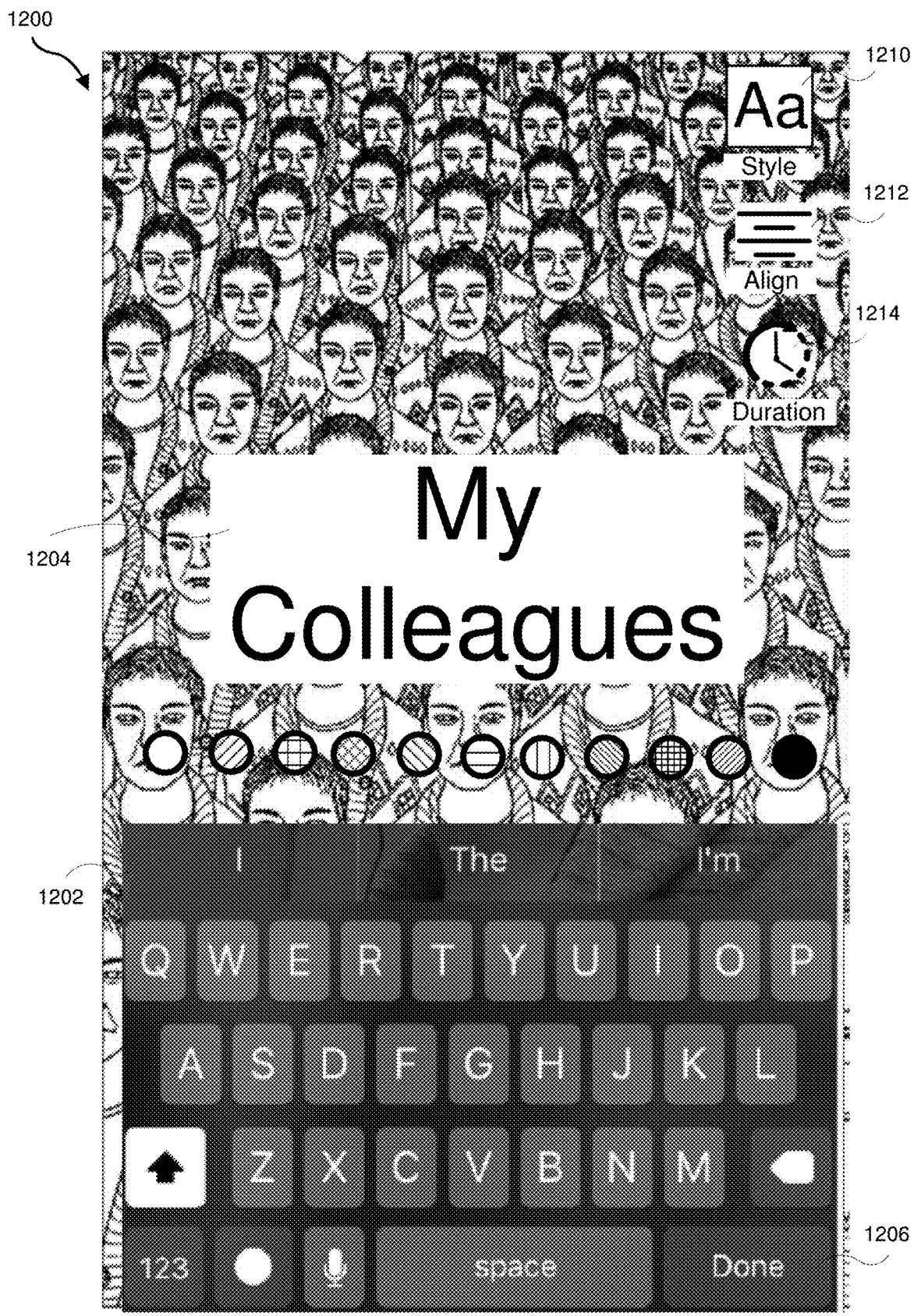
FIG. 12 is an illustration of an example user interface for entering text for a text overlay for a second clip of a remixed video file.
Figure 13:
FIG. 13 is an illustration representative of a first clip of an example remixed video file based on a baseline video file.
Figure 14:
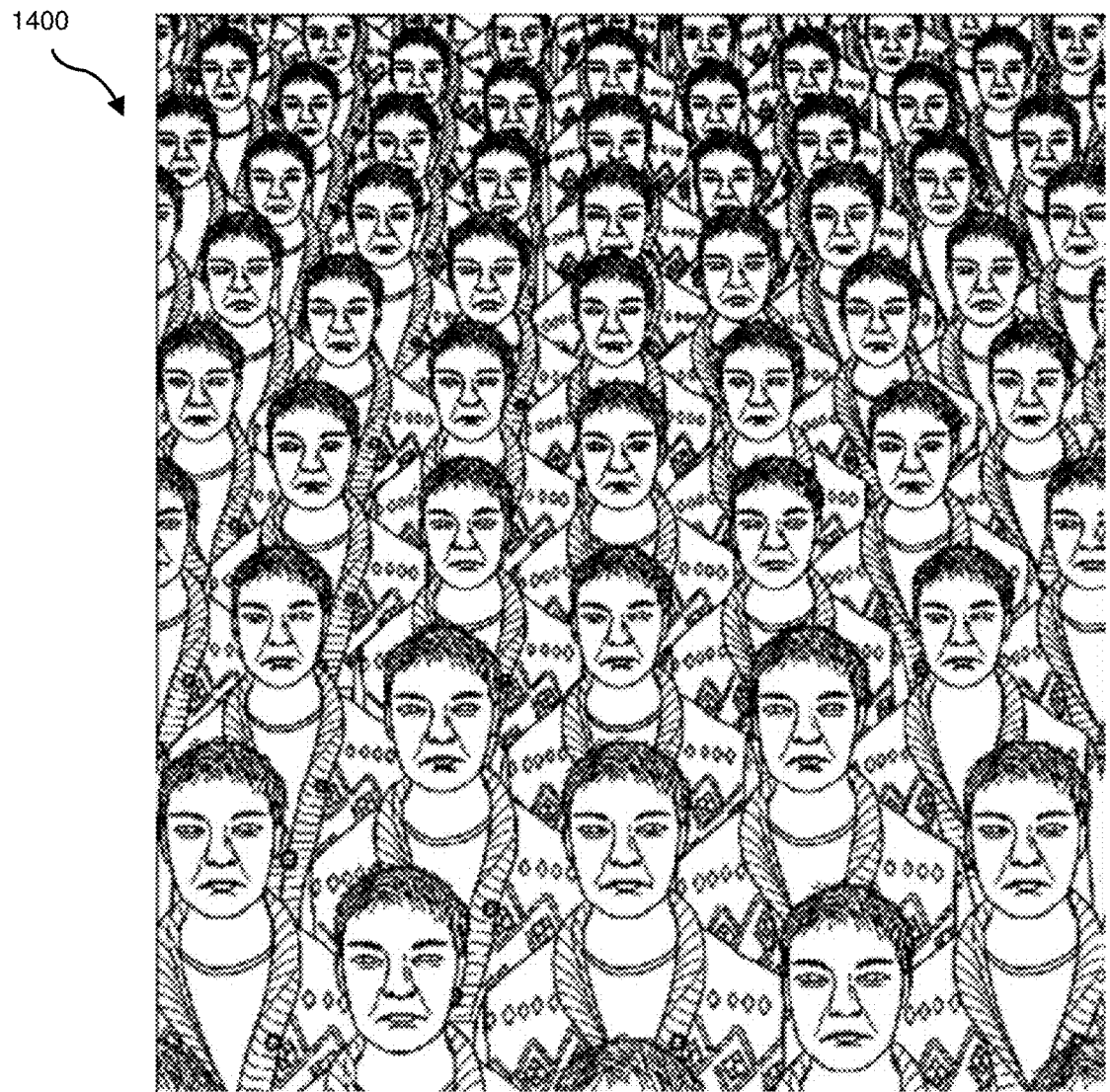
FIG. 14 is another illustration representative of a second clip of an example remixed video file based on a baseline video file.
Figure 14:
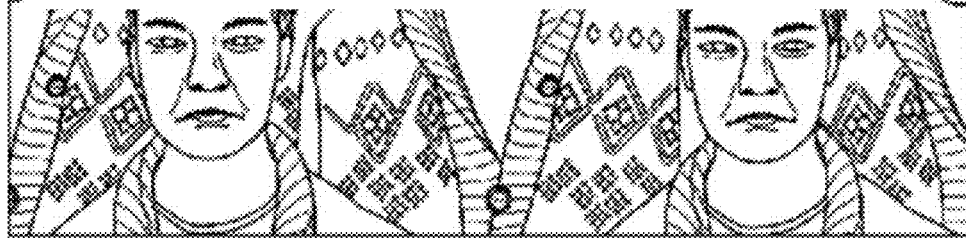

FIGS. 5-12 show illustrations of examples of a recording of a new video file for remixing with a baseline video file and of the use of a user interface to create and generate a remixed video file as shown, for example, in FIGS. 13 and 14. The user interfaces described herein may be displayed on a display device of a computing device. For example, referring to FIG. 1, the user interfaces may be displayed on the display device 126 of the computing device 124.

Figure 5:
FIG. 5 is an illustration of an example user interface for a video application that remixes videos as shown on a feed screen of a video for remixing.

FIG. 5 is an illustration of an example first user interface 500 for a video application that remixes videos as shown on a feed screen 504 of a video for remixing. A user may select a baseline video file for viewing on a display device of a computing device. Referring to FIGS. 1-4, a user may view the original video file 118 that includes the first clip 300 with the first text overlay 302 and the second clip 400 with the second text overlay 402. In some implementations, the first user interface 500 may be overlaid or superimposed on the feed screen 504 of the original video file 118. The first user interface 500 may include a template button 502 that, when selected by a user, provides a second user interface 600 as shown in FIG. 6.

Figure 6:
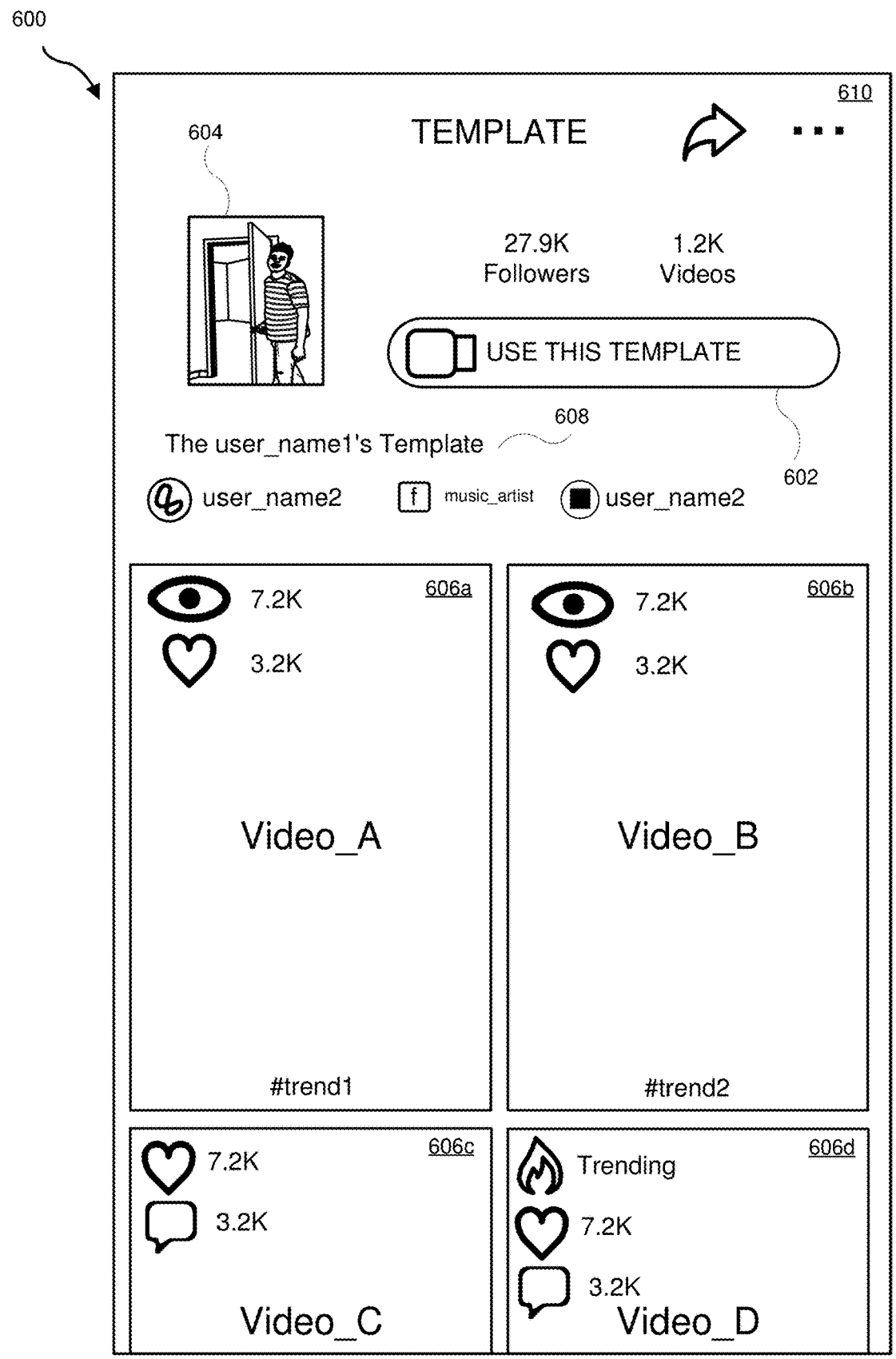
FIG. 6 is an illustration of an example user interface for a template aggregation page.

FIG. 6 is an illustration of an example second user interface 600 that shows a template aggregation page 610. The template aggregation page 610 may display one or more remixed video files (e.g., remixed videos 606a-d) created using a common remix template. As shown in FIG. 6, the common remix template is user_name1's template as indicated by a text entry 608 and as represented by a thumbnail of a frame representative of a baseline video file (e.g., thumbnail 604) used to generate or create the remix template. A user may select template button 602 to select the remix template (user_name1's template as indicated by a text entry 608 and as represented by thumbnail 604) used to create each of the remixed videos 606a-d for use as a remix template for creating a remixed video file using new content provided by the user. In the example shown in FIG. 6, referring to FIGS. 1-5, a user may select the template button 602 to use the remix template generated from the example baseline video file as shown in FIGS. 3-4 to remix with content provided by the user Once a user has selected the template button 602, the first user interface 500 as shown in FIG. 5 may be displayed to the user. A user may select a remix icon 506 to begin a process for remixing the baseline video file with new content of the user using the remix template (e.g., user_name1's template as indicated by the text entry 608 and as represented by the thumbnail 604) generated from the baseline video file.

Figure 7:
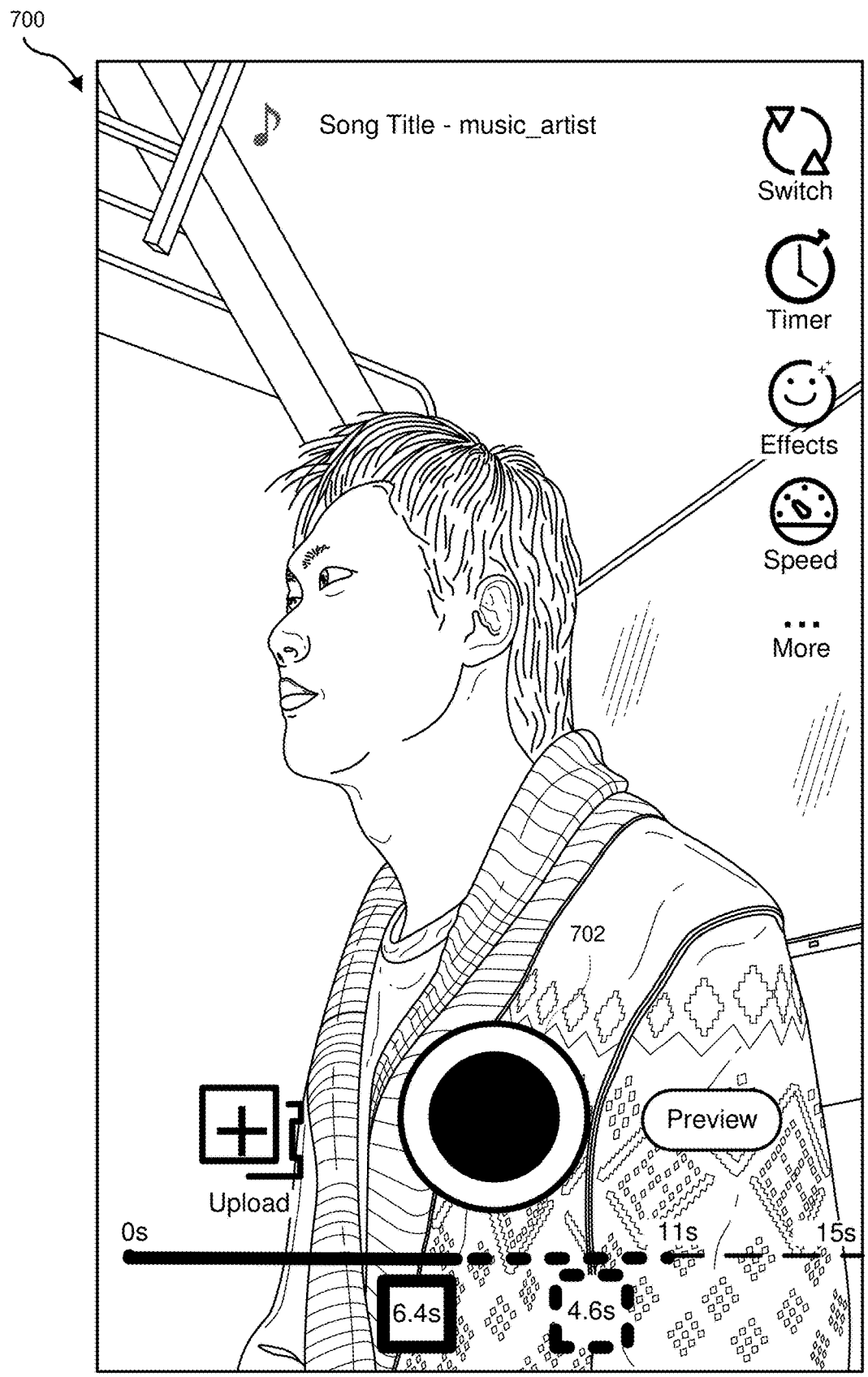
FIG. 7 is an illustration of an example user interface for use in the recording of new video data for remixing with a first clip of a baseline video file.

FIG. 7 is an illustration of an example third user interface 700 for use in the recording of new video data for remixing with a first clip of a baseline video file. In the example shown in FIG. 7, a user may record a 6.4 second video clip. The length of the recording of the video clip may be dependent on a length of a first clip (e.g., the first clip 300) of the baseline video file (e.g., the original video file 118). For example, the user may select a record button 702 to record the 6.4 second video clip.

Figure 8:
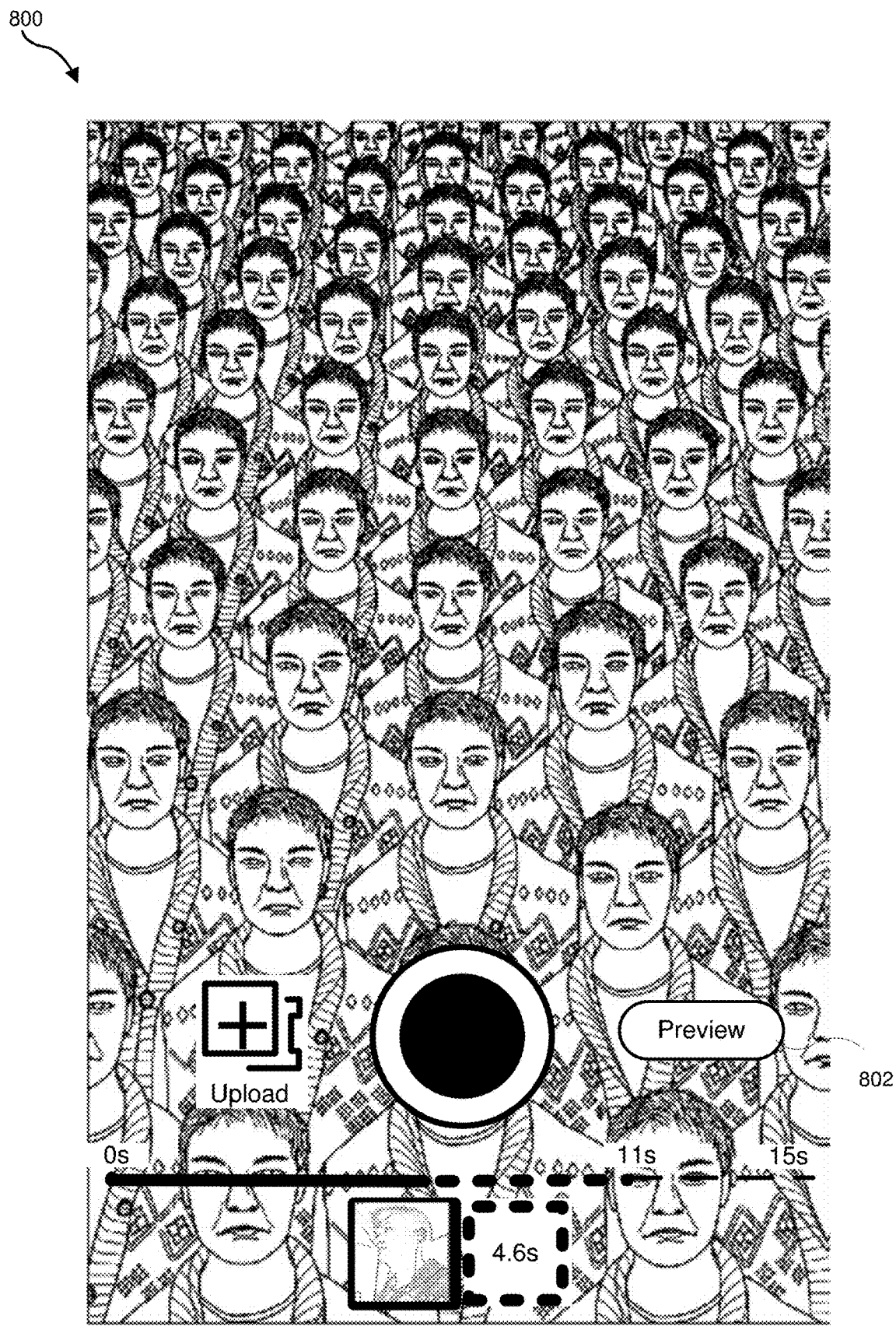
FIG. 8 is an illustration of an example applying of an effect on a recording of new video data when remixing a second clip of a baseline video file with the new video data.

FIG. 8 is an illustration of an example applying of an effect on a recording of new video data when remixing a second clip of a baseline video file with the new video data. FIG. 8 shows a recording 800 of a remixing of the second clip 400 of the original video file 118 with new image data 144 (e.g., a new video clip) as captured in the recording of the new video data 142. As shown in FIG. 8, the remixed second clip is of a 4.6 second duration (i.e., the same duration as the second clip 400 of the original video file 118). The user may then select a preview button 802. The selection of the preview button 802 may display a fourth user interface 900 as shown in FIG. 9.

Figure 9:
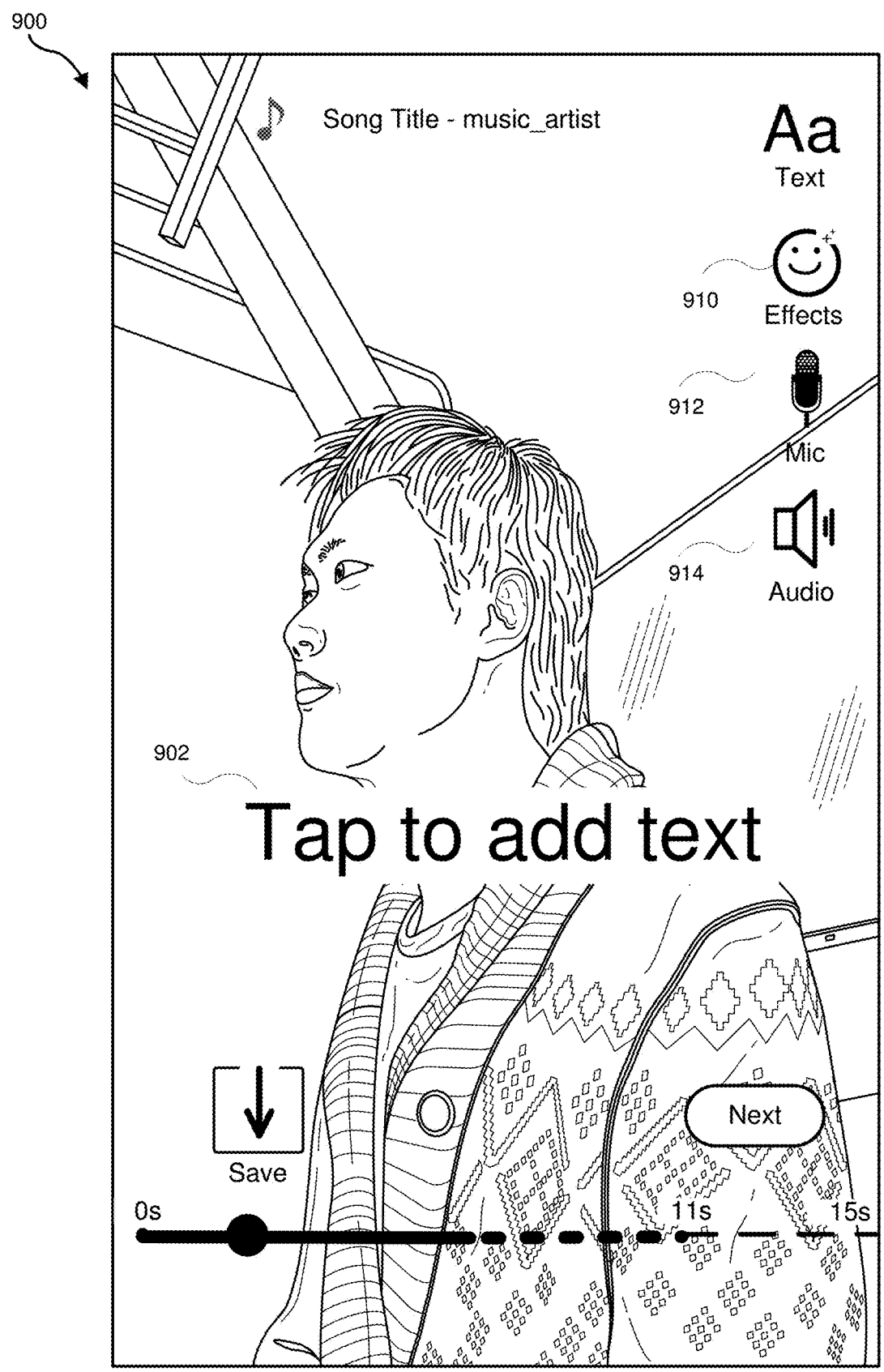
FIG. 9 is an illustration of an example user interface for adding text to a first clip of a remixed video file.

FIG. 9 is an illustration of an example fourth user interface 900 for adding text to a first clip of a remixed video file. In the example shown in FIG. 9, referring to FIGS. 1-3, a user may be prompted to enter new text data 148 for including in a first text overlay for a remixed version of the first clip 300. Once a user selects the new text data box 902, the user interface 130 may display a fifth user interface 1000 as shown in FIG. 10.

Figure 10:
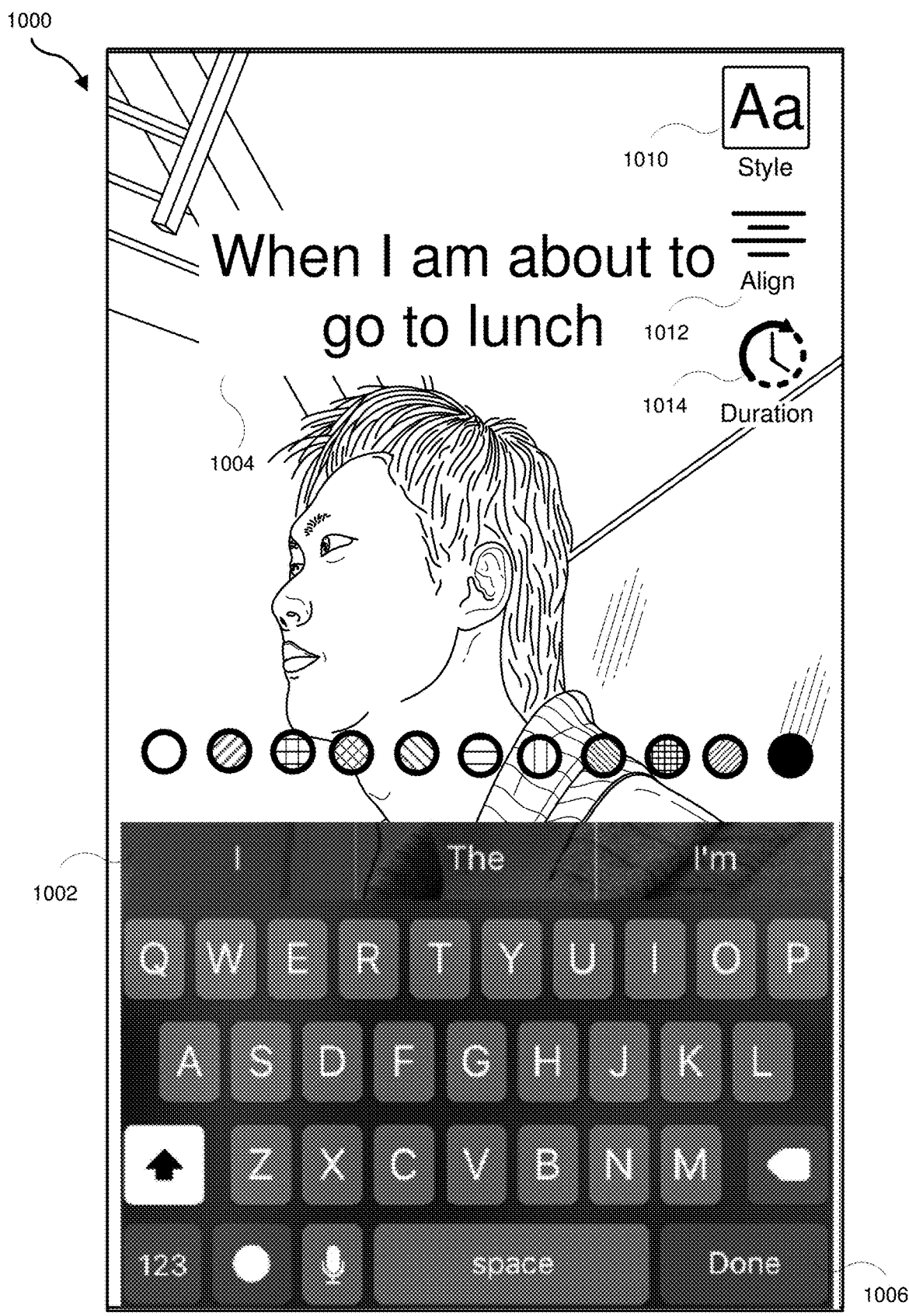
FIG. 10 is an illustration of an example user interface for entering text for a text overlay for a first clip of a remixed video file.

FIG. 10 is an illustration of an example fifth user interface 1000 for entering text for a text overlay for a first clip of a remixed video file. A user interacting with an on-screen keyboard 1002 may enter text data in a text box 1004. The entered text data may be stored as the new text data 148 for use when remixing the original video file 118 with the new content 114. The remixer 102 may substitute the new text data 148 entered in the text box 1004 with the original text data 162 for the first clip 300 (e.g., the original text data included in the first text overlay 302). Once complete, the user may select a done button 1006 and the user interface 130 may display a sixth user interface 1100 as shown in FIG. 11.

FIG. 11 is an illustration of an example sixth user interface 1100 for adding text to a second clip of a remixed video file. In the example shown in FIG. 11, referring to FIGS. 1, 2, and 4, a user may be prompted to enter new text data 148 for including in a second text overlay for a remixed version of the second clip 400. Once a user selects the new text data box 1102, the user interface 130 may display a seventh user interface 1200 as shown in FIG. 12.

FIG. 12 is an illustration of an example seventh user interface 1200 for entering text for a text overlay for a second clip of a remixed video file. A user interacting with an on-screen keyboard 1202 may enter text data in a text box 1204. The entered text data may be stored as the new text data 148 for use when remixing the original video file 118 with the new content 114. The remixer 102 may substitute the new text data 148 entered in the text box 1204 with the original text data 162 for the second clip 400 (e.g., the original text data included in the second text overlay 402). Once complete, the user may select a done button 1206.

FIG. 13 is an illustration representative of a first clip of an example remixed video file based on a baseline video file (such as original video file 118 in FIGS. 1 and 2). In this example, the first clip 300 and the first text overlay 302 from the baseline video file in FIG. 3 have been replaced with a first clip 1300 and a first remixed text overlay 1302, respectively.

FIG. 14 is an additional illustration representative of a second clip of an example remixed video file based on a baseline video file. As shown in this example, the second clip 400 and the second text overlay 402 from the baseline video file in FIG. 4 have been replaced with a second clip 1400 and a second remixed text overlay 1402, respectively.

Referring to FIG. 9, in some implementations a user may interact with the fourth user interface 900 to select, provide, or enter information and data for use in remixing a baseline video file. Referring to FIGS. 1 and 2, the selections provided to a user in the fourth user interface 900 may be based on the original metadata 138 extracted from the original video file 118. The template creator 150 may use the original metadata 138 when creating the remix template 112.

A user interface may provide controls for specifying or selecting one or more characteristics associated with the original metadata for the baseline video file that may be substituted or swapped with other characteristics for use in creating a remixed version of the baseline video file. The user interface may also provide controls for selecting or entering information and data for substituting or swapping.

For example, referring to FIGS. 1, 3, and 9, the fourth user interface 900 may include an effects icon 910, a microphone icon 912, and an audio icon 914. The selection of the effects icon 910 may present the user with a user interface that allows the user to select a type of effect to apply to a first clip of a remixed video file. In some implementations, the type of effect may be substituted or swapped with an effect for the first clip 300 for the original video data 132. The selection of the microphone icon 912 may allow a user to record audio content or data for including in the first clip of the remixed video file. In some implementations, the audio data may substituted or swapped with audio data for the first clip 300 for the original video data 132. The selection of the audio icon 914 may allow a user to select audio content or data (e.g., select music) for including in the first clip of the remixed video file. In some implementations, the audio data may substituted or swapped with audio data for the first clip 300 for the original video data 132.

For example, referring to FIGS. 1, 3, and 10, when entering text data for including in a remixed version of the first clip 300 of the original video file 118, the fifth user interface 1000 may include a style icon 1010. Selection of the style icon 1010 may present the user with a user interface that allows the user to select characteristics of the style of the text included in the first text overlay 302 of the first clip 300 that may be substituted or swapped, and the data for swapping. The selection of the style icon 1010 may allow a user to modify or change a style of the remixed text overlay. The changes may include, but are not limited to, a font type for the text, a color of the text, whether to provide the text with or without a background color, and, if a selection for the use of a back ground color for the text is selected, a color for the background color.

For example, referring to FIGS. 1, 3, and 10, when entering text data for including in a remixed version of the first clip 300 of the original video file 118, the fifth user interface 1000 may include an align icon 1012. Selection of the align icon 1012 may present the user with a user interface that allows the user to select an alignment of the overlay text within the clip of the video.

For example, referring to FIGS. 1, 3, and 10, when entering text data for including in a remixed version of the first clip 300 of the original video file 118, the fifth user interface 1000 may include a duration icon 1014. Selection of the duration icon 1014 may present the user with a user interface that allows the user to select a duration for the text overlay within the first clip of the remixed video file 116.

Referring to FIG. 11, in some implementations a user may interact with the sixth user interface 1100 to select, provide, or enter information and data for use in remixing a baseline video file. Referring to FIGS. 1 and 2, the selections provided to a user in the sixth user interface 1100 may be based on the original metadata 138 extracted from the original video file 118. The template creator 150 may use the original metadata 138 when creating the remix template 112.

A user interface may provide controls for specifying or selecting one or more characteristics associated with the original metadata for the baseline video file that may be substituted or swapped with other characteristics for use in creating a remixed version of the baseline video file. A user interface may provide controls for selecting or entering information and data for substituting or swapping.

For example, referring to FIGS. 1, 4, and 11, the sixth user interface 1100 may include an effects icon 1110, a microphone icon 1112, and an audio icon 1114. The selection of the effects icon 1110 may present the user with a user interface that allows the user to select a type of effect to apply to a second clip of a remixed video file. In some implementations, the type of effect may be substituted or swapped with an effect for the second clip 400 for the original video data 132. The selection of the microphone icon 1112 may allow a user to record audio content or data for including in the second clip of the remixed video file. In some implementations, the audio data may substituted or swapped with audio data for the second clip 400 for the original video data 132. The selection of the audio icon 1114 may allow a user to select audio content or data (e.g., select music) for including in the second clip of the remixed video file. In some implementations, the audio data may substituted or swapped with audio data for the second clip 400 for the original video data 132.

For example, referring to FIGS. 1, 4, and 12, when entering text data for including in a remixed version of the second clip 400 of the original video file 118, the seventh user interface 1200 may include a style icon 1210. Selection of the style icon 1210 may present the user with a user interface that allows the user to select characteristics of the style of the text included in the second text overlay 402 of the second clip 400 that may be substituted or swapped, and the data for swapping. The selection of the style icon 1210 may allow a user to modify or change a style of the remixed text overlay. The changes may include, but are not limited to, a font type for the text, a color of the text, whether to provide the text with or without a background color, and, if a selection for the use of a back ground color for the text is selected, a color for the background color.

For example, referring to FIGS. 1, 4, and 12, when entering text data for including in a remixed version of the second clip 400 of the original video file 118, the seventh ser interface 1200 may include an align icon 1212. Selection of the align icon 1212 may present the user with a user interface that allows the user to select an alignment of the overlay text within the clip of the video.

For example, referring to FIGS. 1, 4, and 12, when entering text data for including in a remixed version of the second clip 400 of the original video file 118, the seventh ser interface 1200 may include a duration icon 1214. Selection of the duration icon 1214 may present the user with a user interface that allows the user to select duration for the text overlay within the second clip of the remixed video file 116.

Figure 15:
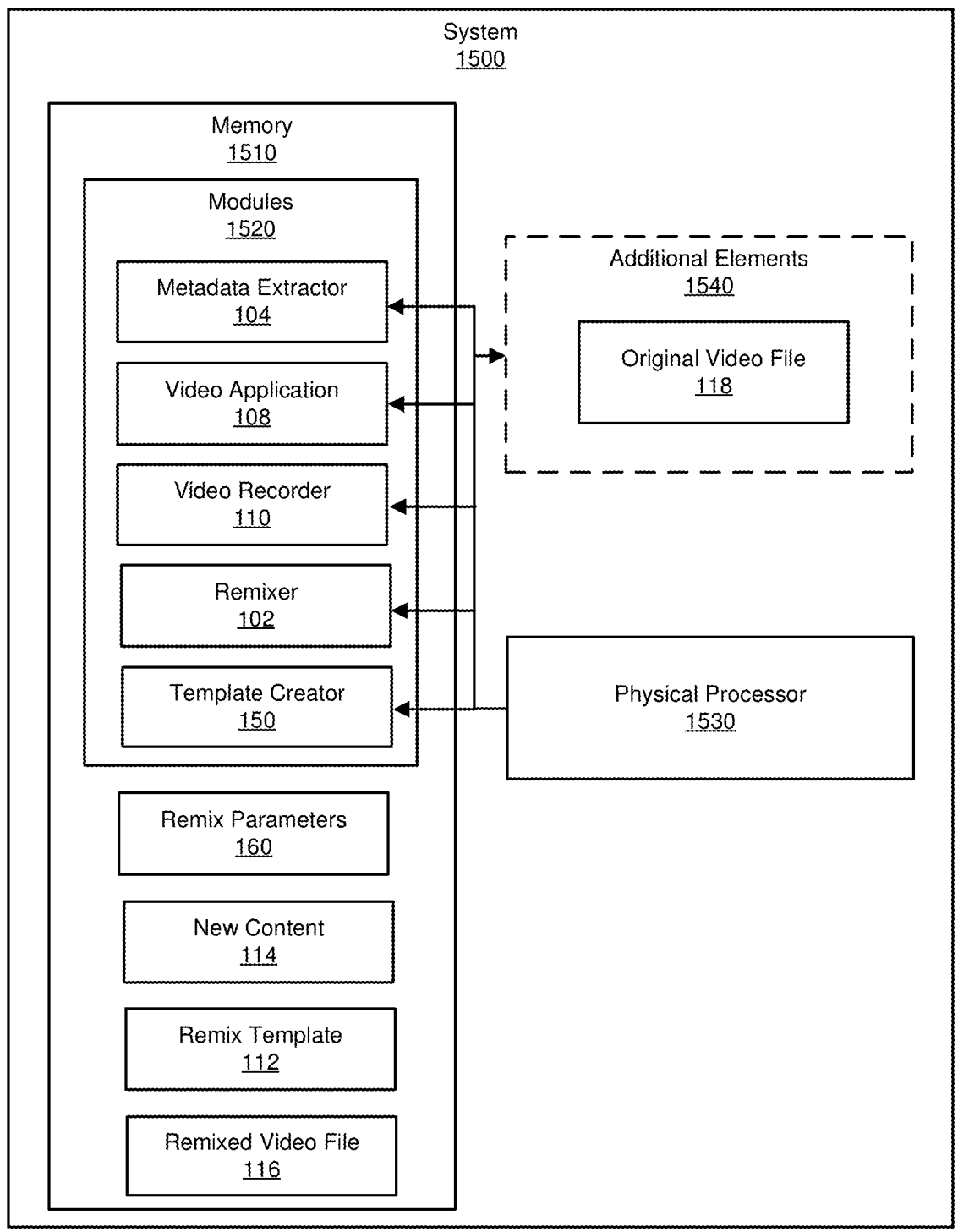
FIG. 15 is a block diagram of an example system that includes modules for use in generating templates for videos.

FIG. 15 is a block diagram of an example system 1500 that includes modules for use in creating remixed videos. Referring to FIGS. 1 and 2, modules 1520 may include the metadata extractor 104, the video application 108, the video recorder 110, the remixer 102, and the template creator 150. Although illustrated as separate elements, one or more of modules 1520 in FIG. 15 may represent portions of a single module or application.

In certain embodiments, one or more of modules 1520 in FIG. 15 may represent one or more software applications or programs that, when executed by a computing device, may cause the computing device to perform one or more tasks. As illustrated in FIG. 15, example system 1500 may also include one or more memory devices, such as memory 1510. The memory 1610 may include the modules 1620, the remix parameters 160, the new content 114, the remix template 112, and the remixed video file 116. Memory 1510 generally represents any type or form of volatile or non-volatile storage device or medium capable of storing data and/or computer-readable instructions. In one example, memory 1510 may store, load, and/or maintain one or more of modules 1620. Examples of memory 1510 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 15, example system 1500 may also include one or more physical processors, such as physical processor 1530. Physical processor 1530 generally represents any type or form of hardware-implemented processing unit capable of interpreting and/or executing computer-readable instructions. In one example, physical processor 1530 may access and/or modify one or more of modules 1520 stored in memory 1510. Additionally, or alternatively, physical processor 1530 may execute one or more of modules 1520. Examples of physical processor 1530 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 15, example system 1500 may also include one or more additional elements 1540. The additional elements 1540 generally represent any type or form of hardware and/or software. In one example, physical processor 1530 may access and/or modify one or more of the additional elements 1540. The additional elements 1540 may include the original video file 118.

The additional elements 1540 may be included in one or more repositories. The one or more repositories may be memory (e.g., the memory 1510). The one or more repositories may be databases. In some implementations, the additional elements 1540 may be included (part of) the system 1500. In some implementations, the additional elements 1540 may be external to the system 1500 and accessible by the system 1500.

Figure 16:
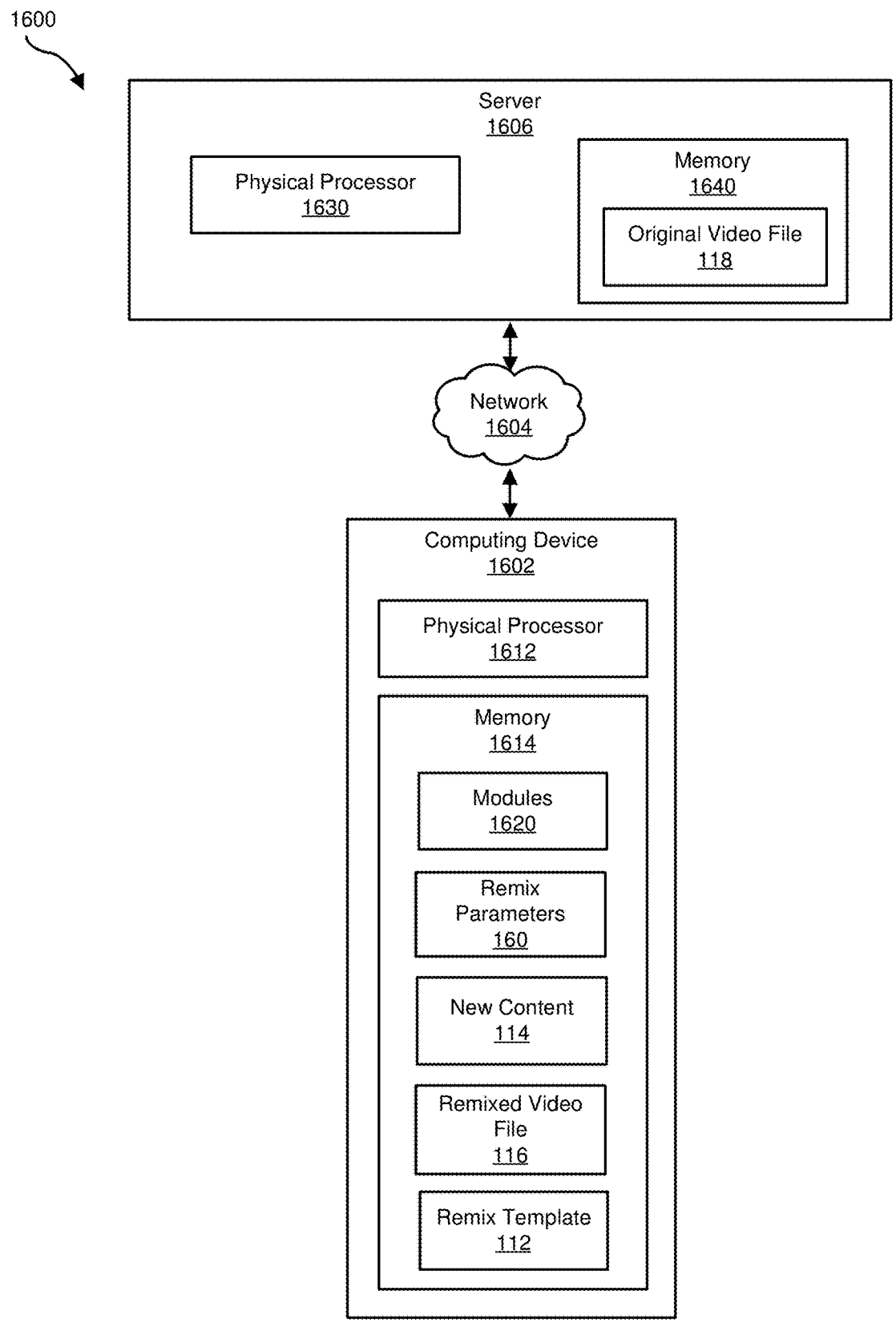
FIG. 16 illustrates an exemplary network environment in which aspects of the present disclosure may be implemented.

FIG. 16 illustrates an exemplary network environment 1600 in which aspects of the present disclosure may be implemented. The network environment 1600 may include one or more computing devices (e.g., computing device 1602), a network 1604, and a server 1606. In one example, server 1606 may host a system for storing and providing baseline video files for use in remixing. In this example, the server 1606 may include a physical processor 1630 that may be one or more general-purpose processors that execute software instructions. The server 1606 may include a data storage subsystem that includes a memory 1640 which may store software instructions, along with data (e.g., input and/or output data) processed by execution of those instructions. The memory 1640 may include the original video file 118. In some implementations, all or part of the memory 1640 may be external to the server 1606 and the computing device 1602 and may be accessible by the server 1606 either directly (a direct connection) or by way of the network 1604.

The computing device 1602 may represent a client device or a user device, such a desktop computer, laptop computer, tablet device, smartphone, or other computing device. The computing device 1602 may include a physical processor (e.g., physical processor 1612), which may represent a single processor or multiple processors, and one or more memory devices (e.g., memory 1614), which may store instructions (e.g., software applications) and/or data in one or more of the modules 1620. The modules 1620 may store software instructions, along with data (e.g., input and/or output data) processed by execution of those instructions.

The computing device 1602 may be communicatively coupled to server 1606 through the network 1604. The network 1604 may be any communication network, such as the Internet, a Wide Area Network (WAN), or a Local Area Network (LAN), and may include various types of communication protocols and physical connections.

Figure 17:
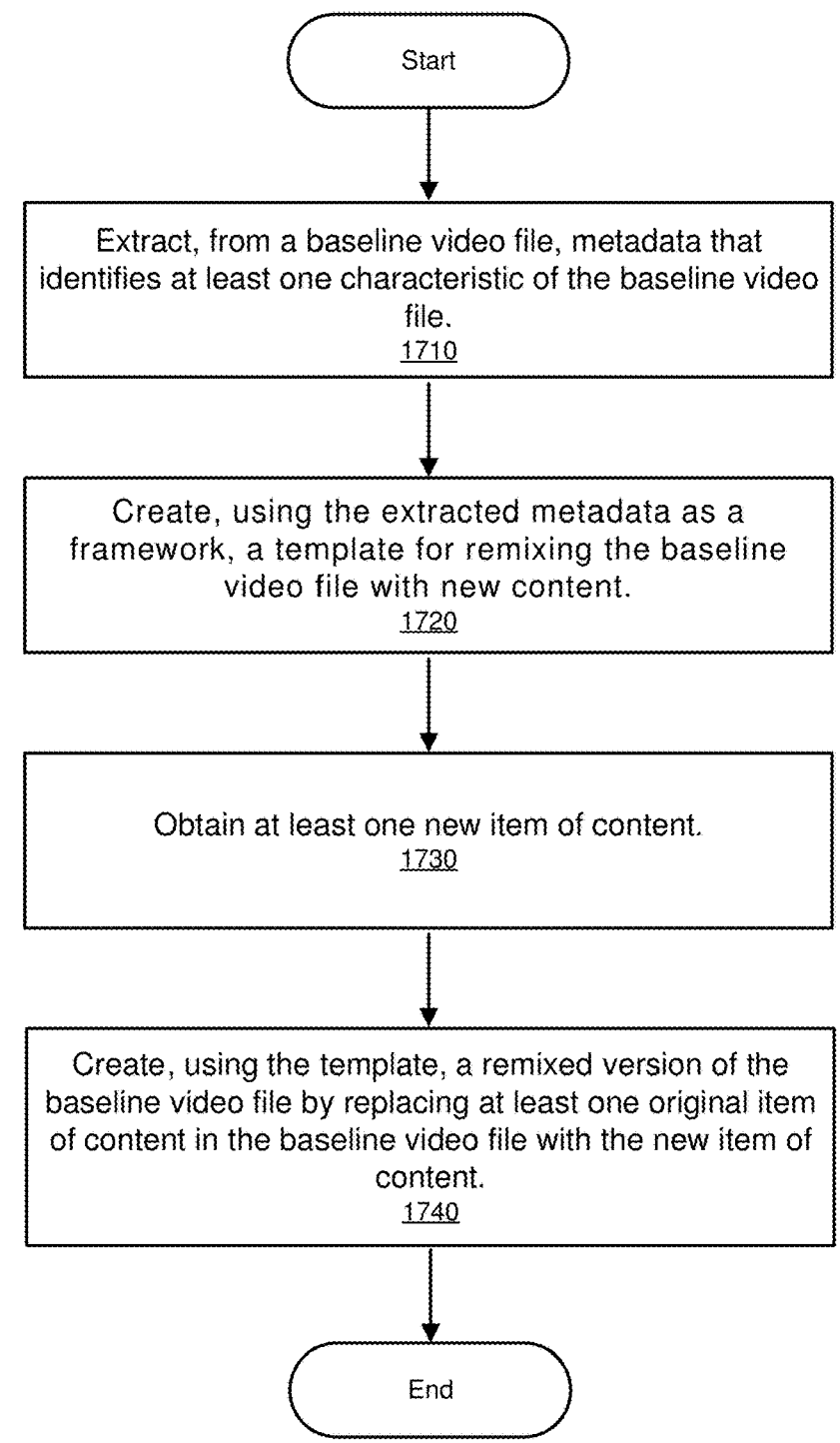
FIG. 17 is a flow diagram of an exemplary method for creating a remixed version of a baseline video file.

FIG. 17 is a flow diagram of an exemplary computer-implemented method 1700 for creating a remixed version of a baseline video file. The steps shown in FIG. 17 may be performed by any suitable computer-executable code and/or computing system, including the system(s) illustrated in FIGS. 1, 15, and 16. In one example, each of the steps shown in FIG. 17 may represent an algorithm whose structure includes and/or is represented by multiple sub-steps, examples of which will be provided in greater detail below.

As illustrated in FIG. 17, at step 1710 one or more of the systems described herein may extract, from a baseline video file, metadata that identifies at least one characteristic of the baseline video file. For example, referring to FIG. 1, the metadata extractor 104 may extract the original metadata 138 from the original video file 118. The original metadata 138 may include metadata for one or more clips included in the original video file 118, metadata for audio data included in the original video file 118, metadata for the effects data for the original video file 118, and metadata for one or more text overlays for the text data included in the original video file 118.

In some embodiments, the term "metadata" may refer to information included in data. Examples of metadata for a video file include, without limitation, metadata for each clip included in the video file, metadata for the audio data (music) included in the video file, metadata for each effect included in the video file, and metadata for each text overlay included in the video file. The metadata for each clip may include, without limitation, the number of clips in the video file and/or a duration of each clip in the video file. The metadata for each audio datum included in the audio data included in the video file may include, without limitation, the name for the audio datum (e.g., the name of the music) and a start time for the audio datum. The metadata for each effect applied to the video file may include, without limitation, a type of effect and which clip (e.g., clip number) to apply the effect to. The metadata for each text overlay included in the video file may include, without limitation, a number of the text overlay, a duration of the text overlay, a start time in the video file for the display of the text overlay, a position for the text overlay within the frame of the image data of the video file, and a style of the text layer which may include, without limitation, a font type for the overlay text, a color of the overlay text, an alignment of the overlay text within the text overlay, and if the text overlay should be displayed with or without a background, and if with a background, a color for the background.

The systems described herein may perform step 1710 in a variety of ways. In one example, the video application 108 may receive, by way of the user interface 130, a selection of the original video file 118. The video application 108 may interface with the metadata extractor 104. The video application 108 may provide the metadata extractor 104 with the information needed for the metadata extractor 104 to access the original video file 118 and extract the original metadata 138. In one non-limiting example, the video application 108 may provide the metadata extractor with a URL of original video file 118. The metadata extractor 104 may access the original video file 118 by way of the network 122 using the URL of the original video file 118.

As illustrated in FIG. 17, at step 1720 one or more of the systems described herein may create, using the extracted metadata as a framework, a template for remixing the baseline video file with new content. For example, the metadata extractor 104 may provide the template creator 150 with the extracted metadata as a framework for use by the template creator 150 in creating the remix template 112.

In some embodiments, the term "framework" may refer to a basic data structure that may be used as a platform for building or developing parts of a system. Examples of a framework include, without limitation, a platform or data structure for use in developing a template that identifies and defines one or more characteristics of a video file and the data associated with each characteristic that can be substituted, entered, or swapped when creating a remixed version of the video file.

In some embodiments, the term "template" may refer to a file or other stored data that may be pre-formatted to include information and data for use by a software application. Examples of a template include, without limitation, a template that includes stored data for a video file that may be altered, swapped, or substituted when creating a remixed version of the video file. The template may be a remix template (e.g., the remix template 112) whose data structure is based on the metadata for a baseline video file. A template creator (e.g., the template creator 150) may create a remix template (e.g., the remix template 112) in the same format for multiple video files.

The systems described herein may perform step 1720 in a variety of ways. In one example, the template creator 150 may receive the extracted metadata from the metadata extractor 104. In addition, or in the alternative, the template creator 150 may receive information and data related to the video file from the video application 108. The template creator 150 may use the received extracted metadata along with any information received from the video application to create a remix template 112.

As illustrated in FIG. 17, at step 1730 one or more of the systems described herein may obtain at least one new item of content. For example, the video application 108 may obtain at least one item from the new content 114.

In some embodiments, the term "content" may refer to data included in a video file. Examples of content include, without limitation, image data, audio data, and text data.

The systems described herein may perform step 1730 in a variety of ways. In one example, the video application 108 may receive by way of the user interface 130 a selection of new content for use in creating a remixed version of a video file. In one non-limiting example, a user may interface with the video recorder 110 and record new image data 144 and/or new audio data 146 as described herein. In another non-limiting example, a user may interface with the user interface 130 to enter text for use in one or more text overlays in a remixed version of the video file. The text data may be stored in the new text data 148. In another non-limiting example, a user may interface with the user interface 130 to select one or more effects for applying to one or more clips, respectively, included in the video file.

As illustrated in FIG. 17, at step 1740 one or more of the systems described herein may create, using the template, a remixed version of the baseline video file by replacing at least one original item of content in the baseline video file with the new item of content. For example, the remixer 102 may create the remixed video file 116 using the remix template 112. The creating may include replacing one or more of the original video data 132, the original effects data, and the original text data with the new video data 142, the new effects data 166, and the new text data 148, respectively.

In some embodiments, the term "remix" may refer to creating a different version of an original recording that may mimic the original recording by substituting, swapping, or altering parts of the original recording. Examples of remixing include, without limitation, using the metadata from a baseline video file as a basis for identifying one or more characteristics of the baseline video file that may be altered, substituted, or swapped when creating a remixed version of the baseline file.

The systems described herein may perform step 1740 in a variety of ways. In one example, the remixer 102 may use the remix template 112 as a basis or platform for creating the remixed version of the baseline video file (e.g., the remixed video file 116, the remixed version of the original video file 118). The remixer 102 may receive as input remix parameters 160. The remix parameters 160 may identify and/or include data for one or more characteristics of the original metadata 138 identified for altering, substituting, or swapping when creating the remixed video file 116. The remixer 102 may create the remixed video file 116 based on the remix template 112 and the remix parameters. The remixer 102 may store the remixed video file 116 in the memory 140 for subsequent viewing on the display device 126 of the computing device 124.

In some embodiments, the term "video" may refer to visual media content that includes one or more images with or without audio content. In some embodiments, the video may feature moving images. In some embodiments, the video may not include audio content. In some embodiments, the video may include a soundtrack. In some embodiments, the video may include audio content. In some embodiments, the audio content may be overlaid on the visual media content. In some embodiments, the audio content may be synchronized with the visual media content. In some embodiments, the video may be digitally recorded or saved for future viewing or sharing. media content including visual content and no audio content, and media content that are videos that include a soundtrack. For example, a short-form video may be a video that has a duration (e.g., viewing time or playing time) of approximately fifteen seconds.

In some embodiments, the term "short-form video" may refer to videos that have a duration, runtime, playing time, or viewing time of approximately ten minutes or less. In some embodiments, a short-form video may have a duration between approximately ten seconds and ten minutes. In some implementations, a short-form video may also be referred to as a sort-video. In some embodiments, a short-form video may have a duration of approximately sixty seconds or less.

In some embodiments, a short-form video may have a duration of approximately fifteen seconds. In some embodiments, the term "long-form video" may refer to videos that have a duration, runtime, playing time, or viewing time of more than approximately ten minutes. In some embodiments, the term "micro-form video" may refer to videos that have a duration, runtime, playing time, or viewing time of less than approximately ten seconds.

In some embodiments, the term "video sharing application" (which may also be referred to as a short-form video sharing application or a short-video sharing application) may refer to a video-sharing social networking application that enables a user to share a video on a social network. The video sharing application may enable the user to record, upload, convert, compose, edit, modify, remix, store, play back, share, and/or post a video. For example, referring to FIG. 1, the video application 108 may be a video sharing application.

Though the systems and methods described herein have been described for use with short-form videos and the video sharing applications that support short-form videos, in some implementations, the systems and methods described herein may be applied to long-form videos and the video sharing applications that support long-form videos. In addition, or in the alternative, in some implementations, the systems and methods described herein may be applied to micro-form videos and the video sharing applications that support micro-form videos.

As detailed above, by automatically generating templates for creating a remixed version of a baseline video file, the systems described herein may greatly simplify the video composing and creating process for end users. In some cases, these systems may include a user interface that guides a user through the process of remixing the baseline video with content provided by the user. By doing so, these systems may enable the user to quickly and easily create a remixed video file that mimics the baseline video file, thereby obviating the need to completely recreate a new video file from scratch.

EXAMPLE EMBODIMENTS

Example 1: A computer-implemented method may include extracting, from a baseline video file, metadata that identifies at least one characteristic of the baseline video file, creating, using the extracted metadata as a framework, a template for remixing the baseline video file with new content, obtaining at least one new item of content, and creating, using the template, a remixed version of the baseline video file by replacing at least one original item of content in the baseline video file with the new item of content.

Example 2: The computer-implemented method of Example 1, where the baseline video file and the remixed version of the baseline video file may be short-form videos.

Example 3: The computer-implemented method of any of Examples 1 and 2, where the original item of content may include at least one of: image data in the baseline video file, audio data in the baseline video file, text data in the baseline video file, or effects data in the baseline video file.

Example 4: The computer-implemented method of any of Examples 1-3, where the characteristic identified by the metadata may include at least one of a number of original items of content in the baseline video file, an identity of each original item of content in the baseline video file, a length of each original item of content in the baseline video file, a start point for each original item of content in the baseline video file, or an end point for each original item of content in the baseline video file.

Example 5: The computer-implemented method of any of Examples 1-4, where obtaining the new item of content may include receiving, via a user interface, the new item of content.

Example 6: The computer-implemented method of any of Examples 1-5, where replacing the original item of content in the baseline video file with the new item of content may include at least one of: replacing original video data in the baseline video file with new video data, replacing original audio data in the baseline video file with new audio data, replacing original text data in the baseline video file with new text data, or replacing original effects data in the baseline video file with new effects data.

Example 7: The computer-implemented method of any of Examples 1-6, further including, prior to extracting the metadata from the baseline video file, receiving, via a user interface, information that identifies the baseline video file, and accessing the baseline video file using the information that identifies the baseline video file.

Example 8: A system may include a metadata extractor that extracts metadata from a baseline video file, the metadata identifying at least one characteristic of the baseline video file, a template creator that creates, using the extracted metadata as a framework, a template for remixing the baseline video file with new content, a video application that obtains at least one new item of content, a remixer that uses the template to create a remixed version of the baseline video file by replacing at least one original item of content in the baseline video file with the new item of content, and at least one physical processor configured to execute the metadata extractor, the template creator, the video application, and the remixer.

Example 9: The system of Example 8, where the baseline video file and the remixed version of the baseline video file are short-form videos.

Example 10: The system of any of Examples 8 and 9, where the original item of content may include at least one of: image data in the baseline video file, audio data in the baseline video file, text data in the baseline video file, or effects data in the baseline video file.

Example 11: The system of any of Examples 8-10, where the characteristic identified by the metadata may include at least one of a number of original items of content in the baseline video file, an identity of each original item of content in the baseline video file, a length of each original item of content in the baseline video file, a start point for each original item of content in the baseline video file, or an end point for each original item of content in the baseline video file.

Example 12: The system of any of Examples 8-11, where the video application obtains the new item of content via a user interface.

Example 13: The system of any of Examples 8-12, where replacing the original item of content in the baseline video file with the new item of content may include at least one of: replacing original video data in the baseline video file with new video data, replacing original audio data in the baseline video file with new audio data, replacing original text data in the baseline video file with new text data, or replacing original effects data in the baseline video file with new effects data.

Example 14: The system of any of Examples 8-13, where the video application receives, via a user interface, information that identifies the baseline video file, and accesses the baseline video file using the information that identifies the baseline video file.

Example 15: A non-transitory computer-readable medium including one or more computer-executable instructions that, when executed by at least one processor of a computing device, may cause the computing device to extract, from a baseline video file, metadata that identifies at least one characteristic of the baseline video file, create, using the extracted metadata as a framework, a template for remixing the baseline video file with new content, obtain at least one new item of content, and create using the template, a remixed version of the baseline video file by replacing at least one original item of content in the baseline video file with the new item of content.

Example 16: The non-transitory computer-readable medium of Example 15, where the baseline video file and the remixed version of the baseline video file may be short-form videos.

Example 17: The non-transitory computer-readable medium of any of Examples 15-16, where the original item of content may include at least one of: image data in the baseline video file, audio data in the baseline video file, text data in the baseline video file, or effects data in the baseline video file.

Example 18: The non-transitory computer-readable medium of any of Examples 15-17, where the characteristic identified by the metadata may include at least one of a number of original items of content in the baseline video file, an identity of each original item of content in the baseline video file, a length of each original item of content in the baseline video file, a start point for each original item of content in the baseline video file, or an end point for each original item of content in the baseline video file.

Example 19: The non-transitory computer-readable medium of any of Examples 15-18, where obtaining the new item of content may include receiving, via a user interface, the new item of content.

Example 20: The non-transitory computer-readable medium of any of Examples 15-19, where replacing the original item of content in the baseline video file with the new item of content may include at least one of: replacing original video data in the baseline video file with new video data, replacing original audio data in the baseline video file with new audio data, replacing original text data in the baseline video file with new text data, or replacing original effects data in the baseline video file with new effects data.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive video data, effects data, text data and/or metadata to be transformed, transform the video data, effects data, text data and/or metadata, output a result of the transformation when remixing a baseline video file, use the result of the transformation to create a remixed version of the baseline video file, and store the result of the transformation to a memory for viewing by a user on a display device of a computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   extracting, from a baseline video file, metadata that identifies at least one characteristic of the baseline video file;
   creating, using the extracted metadata as a framework for original content included in the baseline video file, a template for remixing the baseline video file with new content, the template identifying, based on the framework, at least one original item of the original content included in the baseline video file as a candidate for replacing when creating a remixed version of the baseline video file;
   obtaining at least one new item of content; and
   creating, using the template, the remixed version of the baseline video file by replacing the at least one original item of the original content in the baseline video file with the new item of content, the replacement based on the at least one characteristic of the baseline video file.

2. The computer-implemented method of claim 1, wherein the baseline video file and the remixed version of the baseline video file are short-form videos.

3. The computer-implemented method of claim 1, wherein the original item of the original content comprises at least one of:
   image data in the baseline video file;
   audio data in the baseline video file;
   text data in the baseline video file; or
   effects data in the baseline video file.

4. The computer-implemented method of claim 1, wherein the characteristic identified by the metadata comprises at least one of:
   a number of original items of content in the baseline video file;
   an identity of each original item of content in the baseline video file;
   a length of each original item of content in the baseline video file;
   a start point for each original item of content in the baseline video file; or
   an end point for each original item of content in the baseline video file.

5. The computer-implemented method of claim 1, wherein obtaining the new item of content comprises receiving, via a user interface, the new item of content.

6. The computer-implemented method of claim 1, wherein replacing the original item of the original content in the baseline video file with the new item of content comprises at least one of:
   replacing original video data in the baseline video file with new video data;
   replacing original audio data in the baseline video file with new audio data;
   replacing original text data in the baseline video file with new text data; or
   replacing original effects data in the baseline video file with new effects data.

7. The computer-implemented method of claim 1, further comprising, prior to extracting the metadata from the baseline video file:
   receiving, via a user interface, information that identifies the baseline video file; and
   accessing the baseline video file using the information that identifies the baseline video file.

8. A system comprising:
   a metadata extractor that extracts metadata from a baseline video file, the metadata identifying at least one characteristic of the baseline video file;
   a template creator that creates, using the extracted metadata as a framework for original content included in the baseline video file, a template for remixing the baseline video file with new content, the template identifying, based on the framework, at least one original item of the original content included in the baseline video file as a candidate for replacing when creating a remixed version of the baseline video file;
   a video application that obtains at least one new item of content;
   a remixer that uses the template to create the remixed version of the baseline video file by replacing the at least one original item of the original content in the baseline video file with the new item of content; and
   at least one physical processor configured to execute the metadata extractor, the template creator, the video application, and the remixer.

9. The system of claim 8, wherein the baseline video file and the remixed version of the baseline video file are short-form videos.

10. The system of claim 8, wherein the original item of the original content comprises at least one of:
    image data in the baseline video file;
    audio data in the baseline video file;
    text data in the baseline video file; or
    effects data in the baseline video file.

11. The system of claim 8, wherein the characteristic identified by the metadata comprises at least one of:
    a number of original items of content in the baseline video file;
    an identity of each original item of content in the baseline video file;
    a length of each original item of content in the baseline video file;
    a start point for each original item of content in the baseline video file; or
    an end point for each original item of content in the baseline video file.

12. The system of claim 8, wherein the video application obtains the new item of content via a user interface.

13. The system of claim 8, wherein replacing the original item of the original content in the baseline video file with the new item of content comprises at least one of:
    replacing original video data in the baseline video file with new video data;
    replacing original audio data in the baseline video file with new audio data;
    replacing original text data in the baseline video file with new text data; or
    replacing original effects data in the baseline video file with new effects data.

14. The system of claim 8, wherein the video application receives, via a user interface, information that identifies the baseline video file, and accesses the baseline video file using the information that identifies the baseline video file.

15. A non-transitory computer-readable medium comprising one or more computer-executable instructions that, when executed by at least one processor of a computing device, cause the computing device to:
    extract, from a baseline video file, metadata that identifies at least one characteristic of the baseline video file;
    create, using the extracted metadata as a framework for original content included in the baseline video file, a template for remixing the baseline video file with new content, the template identifying, based on the framework, at least one original item of the original content included in the baseline video file as a candidate for replacing when creating a remixed version of the baseline video file;
    obtain at least one new item of content; and
    create, using the template, the remixed version of the baseline video file by replacing the at least one original item of the original content in the baseline video file with the new item of content, the replacement based on the at least one characteristic of the baseline video file.

16. The non-transitory computer-readable medium of claim 15, wherein the baseline video file and the remixed version of the baseline video file are short-form videos.

17. The non-transitory computer-readable medium of claim 15, wherein the original item of the original content comprises at least one of:

image data in the baseline video file;
audio data in the baseline video file;
text data in the baseline video file; or
effects data in the baseline video file.

18. The non-transitory computer-readable medium of claim 15, wherein the characteristic identified by the metadata comprises at least one of:
- a number of original items of content in the baseline video file;
- an identity of each original item of content in the baseline video file;
- a length of each original item of content in the baseline video file;
- a start point for each original item of content in the baseline video file; or
- an end point for each original item of content in the baseline video file.

19. The non-transitory computer-readable medium of claim 15, wherein obtaining the new item of content comprises receiving, via a user interface, the new item of content.

20. The non-transitory computer-readable medium of claim 15, wherein replacing the original item of the original content in the baseline video file with the new item of content comprises at least one of:
- replacing original video data in the baseline video file with new video data;
- replacing original audio data in the baseline video file with new audio data;
- replacing original text data in the baseline video file with new text data; or
- replacing original effects data in the baseline video file with new effects data.

* * * * *